US010686195B2

(12) United States Patent
Yang et al.

(10) Patent No.: US 10,686,195 B2
(45) Date of Patent: Jun. 16, 2020

(54) NANOFRAMES WITH THREE-DIMENSIONAL ELECTROCATALYTIC SURFACES

(71) Applicants: THE REGENTS OF THE UNIVERSITY OF CALIFORNIA, Oakland, CA (US); UCHICAGO ARGONNE, LLC, Chicago, IL (US)

(72) Inventors: Peidong Yang, Kensington, CA (US); Vojislav Stamenkovic, Naperville, IL (US); Gabor A. Somorjai, Berkeley, CA (US); Nenad Markovic, Hinsdale, IL (US); Chen Chen, Beijing (CN); Yijin Kang, Naperville, IL (US); Nigel H. Becknell, Berkeley, CA (US)

(73) Assignees: The Regents of the University of California, Oakland, CA (US); UChicago Argonne, LLC, Chicago, IL (US)

( * ) Notice: Subject to any disclaimer, the term of this patent is extended or adjusted under 35 U.S.C. 154(b) by 468 days.

(21) Appl. No.: 14/625,443

(22) Filed: Feb. 18, 2015

(65) Prior Publication Data
US 2015/0236355 A1    Aug. 20, 2015

Related U.S. Application Data

(60) Provisional application No. 61/941,832, filed on Feb. 19, 2014.

(51) Int. Cl.
*H01M 4/92* (2006.01)
*H01M 4/88* (2006.01)
*H01M 4/86* (2006.01)
*B82B 3/00* (2006.01)
(Continued)

(52) U.S. Cl.
CPC .......... *H01M 4/921* (2013.01); *B82B 3/0033* (2013.01); *C22C 1/02* (2013.01); *C22C 5/04* (2013.01); *H01M 4/8657* (2013.01); *H01M 4/8889* (2013.01); *H01M 4/928* (2013.01)

(58) Field of Classification Search
CPC .......... H01M 4/88; H01M 4/92; H01M 4/921; H01M 4/928
See application file for complete search history.

(56) References Cited

U.S. PATENT DOCUMENTS

| 7,252,698 B2 * | 8/2007 | Mirkin | B22F 1/0088 148/430 |
| 2011/0159365 A1 * | 6/2011 | Loveness | H01M 4/0428 429/218.1 |

(Continued)

OTHER PUBLICATIONS

Chen C., et al., Highly Crystalline Multimetallic Nanoframes with Three-Dimensional Electrocatalytic Surfaces, Science 343, pp. 1339-1343 (2014).

(Continued)

*Primary Examiner* — Karie O'Neill Apicella
(74) *Attorney, Agent, or Firm* — Foley & Lardner LLP

(57) ABSTRACT

Described herein are bimetallic nanoframes and methods for producing bimetallic nanoframes. A method may include providing a solution including a plurality of nanoparticles dispersed in a solvent, and exposing the solution to oxygen to convert the plurality of nanoparticles into a plurality of nanoframes.

9 Claims, 21 Drawing Sheets

(51) Int. Cl.
C22C 1/02 (2006.01)
C22C 5/04 (2006.01)

(56) References Cited

U.S. PATENT DOCUMENTS

2013/0085061 A1* 4/2013 Stamenkovic ............ C22C 1/02
502/185
2015/0132683 A1* 5/2015 Shirvanian .......... H01M 4/8657
429/528

OTHER PUBLICATIONS

Stamenkovic, V.R. et al., Improved Oxygen Reduction Activity on $Pt_3Ni(111)$ via Increased Surface Site Availability, Science 315, pp. 497-493 (2007).
Yin, Y.D. et al., Formation of Hollow Nanocrystals Through the Nanoscale Kirkdendall Effect, Science 304, pp. 711-714 (2004).
Macdonald, J.E. et al., Hybrid Nanoscale Inorganic Cages, Nat. Mater. 9, pp. 810-815 (2010).
Skrabalak, S. E. et al., Gold Nanocages: Synthesis, Properties, and Applications, Acc. Chem. Res. 41, pp. 1587-1595 (2008).
McEachran, M. et al., Ultrathin Gold Nanoframes through Surfactant-Free Templating of Faceted Pentagonal Silver Nanoparticles, J. Am. Chem. Soc. 133, pp. 8066-8069 (2011).
Wang, X. et al., One-Pot Solution Synthesis of Cubic Cobalt Nanoskeletons, Adv. Mater. 21, pp. 1636-1640 (2009).
Davis, M.E., Ordered Porous Materials for Emerging Applications, Nature 417, pp. 813-821 (2002).
Johnson, S.A., Ollivier, P.J. & Mallouk, T.E., Ordered Mesoporous Polymers of Tunable Pore Size from Colloidal Silica Templates, Science 283, pp. 963-965 (1999).
Yavuz, M.S. et al., Gold Nanocages Covered by Smart Polymers for Controlled Release with Near-Infrared Light, Nat. Mater. 8, pp. 935-939 (2009).
Wu, Y. et al., Syntheses of Water-Soluble Octahedral, Truncated Octahedral, and Cubic Pt-Ni Nanocrystals and their Structure-Activity Study in Model Hydrogenation Reactions, J. Am. Chem. Soc. 134, pp. 8975-8981 (2012).
Wu, J., Gross A. & Yang, H., Shape and Composition-Controlled Platinum Alloy Nanocrystals Using Carbon Monoxide as Reducing Agent, Nano Lett. 11, pp. 798-802 (2011).
Wu, J. et al., Truncated Octahedral $Pt_3Ni$ Oxygen Reduction Reaction Electrocatalysts, J. Am. Chem. Soc. 132, pp. 4984-4985 (2010).
Dahmani, C.E. et al., Ni-Pt Phase Diagram: Experiment and Theory, Phys. Rev. Lett. 55, pp. 1208-1211 (1985).
Van der Vliet, D.F. et al. Mesostructured Thin Films as Electrocatalysts with Tunable Composition and Surface Morphology, Nat. Mater. 11, pp. 1051-1058 (2012).
Van Der Vliet, D.F. et al. Unique Electrochemical Adsorption Properties of Pt-Skin Surfaces, Angew. Chem. 124, pp. 3193-3196 (2012).
Snyder, J., Livi, K. & Erlebacher, J., Oxygen Reduction Reaction Performance of [MTBD][beti]-Encapsulated Nanoporous NiPt Alloy Nanoparticles, Adv. Func. Mater. 23, pp. 5494-5501 (2013).
Subbaraman, R. et al., Enhancing Hydrogen Evolution Activity in Water Splitting by Tailoring $Li^+$-$Ni(OH)_2$-Pt Interfaces, Science 334, pp. 1256-1260 (2011).
P.J. Ferreira et al., Instability of Pt/C Electrocatalysts in Proton Exchange Mebrane Fuel Cells—A Mechanistic Investigation, J. Electrochem. Soc. 152, pp. A2256-A2271 (2005).
Liu, Y. et al., Self-Terminating Growth of Platinum Films by Electrochemical Deposition, Science 338, pp. 1327-1330 (2012).
Erlebacher, J. et al., Evolution of Nanoporosity in Dealloying, Nature 410, pp. 450-453 (2001).
Guo, S., Zhang, S. & Sun, S., Tuning Nanoparticle Catalysis for the Oxygen Reduction Reaction, Angew. Chem. Int. Ed. 52, pp. 8526-8544 (2013).

Wang, C.; Daimon, H.; Lee, Y.; Kim, J.; Sun, S., Synthesis of Monodisperse Pt Nanocubes and their Enhanced Catalysis for Oxygen Reduction, J. Am. Chem. Soc., 129, pp. 6974-6975 (2007).
Wang, C. et al., Design and Synthesis of Bimetallic Electrocatalyst with Multilayered Pt-Skin Surfaces, J. Am. Chem. Soc. 133, pp. 14396-14403 (2011).
Mahmound, M.A. Qian, W., El-Sayed, M.A., Following Charge Separation on the Nanoscale in $Cu_2O$-Au Nanoframe Hallow Nanoparticles, Nano Lett. 11, pp. 3285-3289 (2011).
Wang, J.X. et al., Kirkendall Effect and Lattice Contraction in Nanocatalysts: A New Strategy to Enhance Sustainable Activity, J. Am. Chem. Soc. 133, pp. 13551-13557 (2011).
Oh, M.H. et al., Galvanic Replacement Reactions in Metal Oxide Nanocrystals, Science 340, pp. 964-968 (2013).
Zeng, J. et al., A Comparison Study of the Catalytic Properties of Au-Based Nanocages, Nanoboxes, and Nanoparticles, Nano Lett. 10, pp. 30-35 (2010).
Zhang, J. et al., Synthesis and Oxygen Reduction Activity of Shape-Controlled $Pt_2Ni$ Nanopolyhedra, Nano Lett. 10, pp. 638-644 (2010).
Choi, S.-J. et al., Synthesis and Characterization of 9 nm Pt—Ni Octahedra with a Record High Activity of 3.3 $A/mg_{Pt}$ for the Oxygen Reduction Reaction, Nano Lett. 13, pp. 3420-3425 (2013).
Kang, Y. et al., Shape-Controlled Synthesis of Pt Nanocrystals: The Role of Metal Carbonyls, ACS Nano 7, pp. 645-653 (2012).
Wang, D. et al., Structurally Order Intermetallic Platinum-Cobalt Core-Shell Nanoparticles with Enhanced Activity and Stability as Oxygen Reduction Electrocatalysts, Nat. Mater. 12, pp. 81-87 (2013).
Snyder, T. et al., Oxygen Reduction in Nanoporous Metal-Ionic Liquid Composite Electrocatalysts, Nat. Mater. 9, pp. 904-907 (2010).
Cui, C. et al., Compositional Segregation in Shaped Pt Alloy Nanoparticles and their Structural Behaviour During Electrocatalysis. Nat. Mater. 12, pp. 765-771 (2013).
Cargnello, M. et al., Control of Metal Nanocrystal Size Reveals Metal—Support Interface Role for Ceria Catalysts, Science 341, pp. 771-773 (2013).
Tao, F. et al., Reaction-Driven Restructuring of Rh-Pd and Pt-Pd Core-Shell Nanoparticles, Science 322, 932-934 (2008).
Hammer, B., Hansen, L.B., Norskov, J.K., Improved Adsorption Energetics within Density-Functional Theory Using Revised Perdew-Burke-Ernzerhof Functionals, Phys. Rev. B 59, pp. 7413-7421 (1990).
Chadi, D.J., Cohen, M.L., Special Points in the Brillouin Zone, Phys. Rev. B 8, pp. 5747-5753 (1973).
Vanderbilt, D., Soft Self-Consistent Pseudopotentials in a Generalized Eigenvalue Formalism, Phys. Rev. B 41, pp. 7892-7895 (1990).
Perdew, J.P. et al., Atoms, Molecules, Solids, and Surfaces: Applications of the Generalized Gradient Approximation for Exchange and Correlation, Phys. Rev. B 46, pp. 6671-6687 (1992).
White, J.A., Bird, D.M., Implementation of Gradient-Corrected Exchange-Correlation Potentials in Car-Parrinello Total-Energy Calculations, Phys. Rev. B 50, pp. 4954-4957 (1994).
Park, S.H., Xia, Y., Macroporous Membranes with Highly Ordered and Three-Dimensionally Interconnected Spherical Pores, Adv. Mater. 10, pp. 1045-1048 (1998).
Wang, D., Li, Y., Effective Octadecylamine System for Nanocrystal Synthesis, Inorg. Chem 50, pp. 5196-5202 (2011).
Tang, L. et al., Electrochemical Stability of Nanometer-Scale Pt Particles in Acidic Environments, J. Am. Chem. Soc. 132, pp. 596-600 (2010).
Kang, Y. et al., Heterogeneous Catalysts Need Not be so "Heterogeneous": Monodisperse Pt Nanocrystals by Combining Shape-Controlled Synthesis and Purification by Colloidal Recrystallization, J.Am. Chem. Soc. 135, pp. 2741-2747 (2013).
Herron, J.A. et al., Oxygen Reduction Reaction on Platinum-Terminated "Onion-Structured" Alloy Catalysts, Electrocatalysis 3, pp. 192-202 (2012).
Salmeron, M., Schlogl, R., Ambient Pressure Photoelectron Spectroscopy: A New Tool for Surface Science and Nanotechnology, Surf. Sci. Rep. 63, pp. 169-199 (2008).

(56) References Cited

OTHER PUBLICATIONS

Grass, M.E. et al., New Ambient Pressure Photoemission Endstation at Advanced Light Source Beamline 9.3.2, Rev. Sci. Instrum. 81, 053106 (2010), 7 pages.
Greeley, J., Norskov, J.K., Mavrikakis M., Electronic Structure and Catalysis on Metal Surfaces, Annu. Rev. Phys. Chem 53, pp. 319-348 (2002).
Armstrong et al. "Evaluating the performance of nanostructured materials as lithium-ion battery electrodes" Tsinghua University Press, Nano Research, vol. 7, No. 1, 2014, pp. 1-62.
Oszajca et al. "Precisely Engineered Colloidal Nanoparticles and Nanocrystals for Li-Ion and Na-Ion Batteries: Model Systems or Practical Solutions?" ACS Pubications, Chemistry of Materials, American Chemical Society, vol. 26, 2014, pp. 5422-5432.

\* cited by examiner

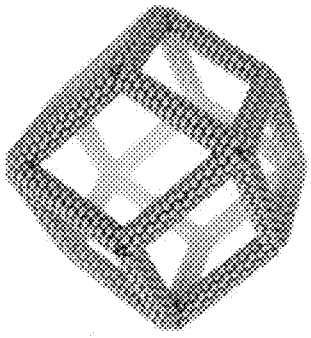
Figure 1A
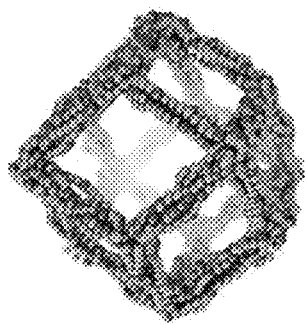
Figure 1B
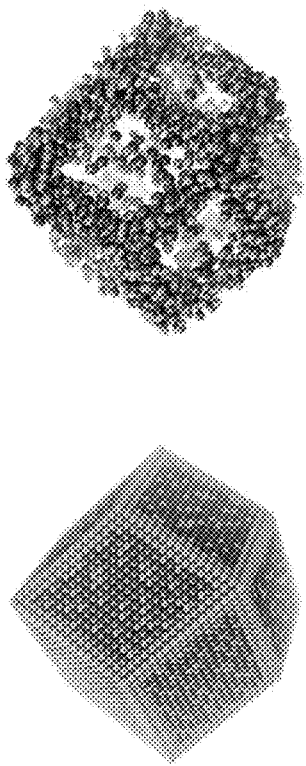
Figure 1C
Figure 1D
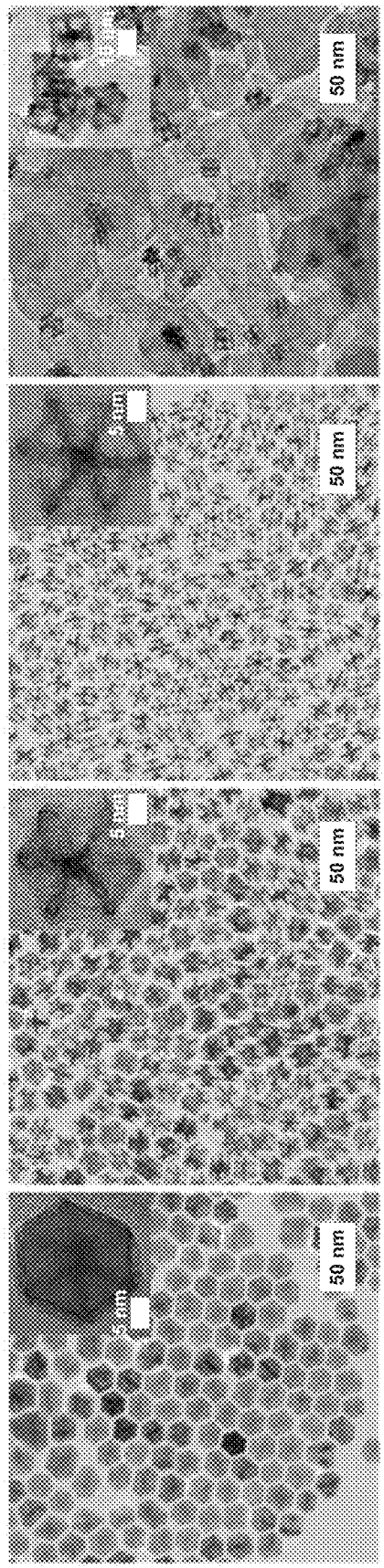

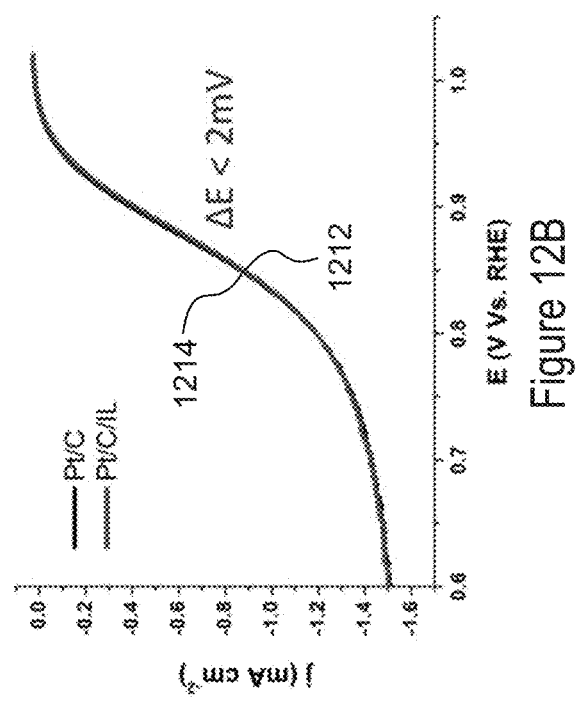
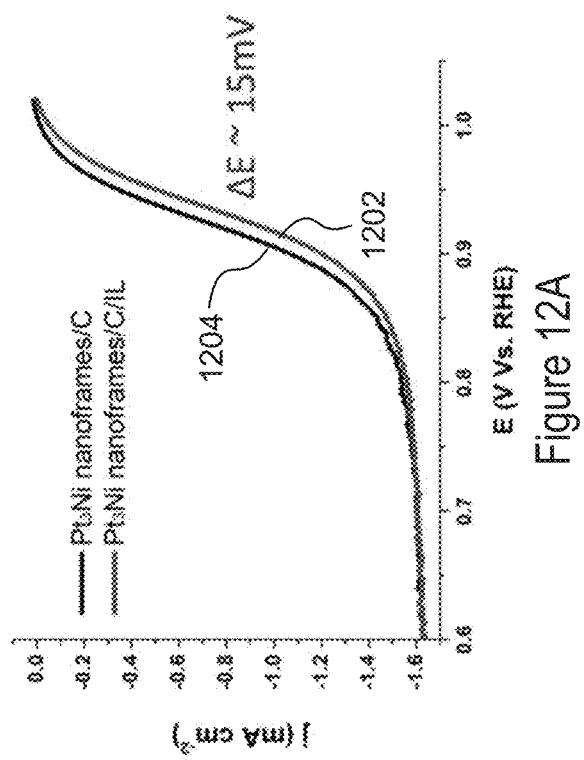
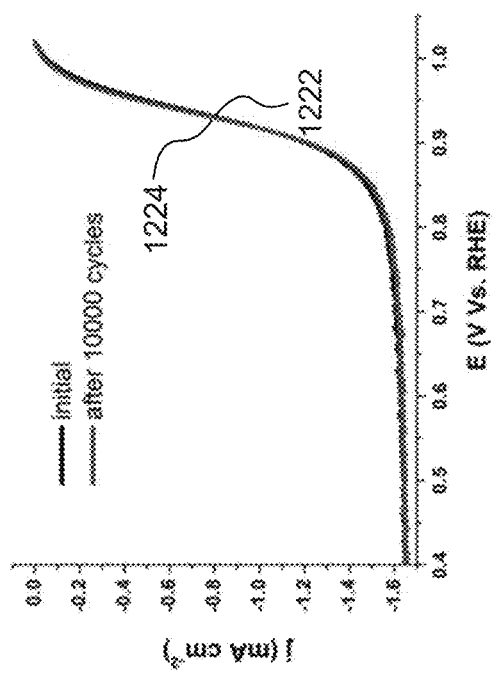

NANOFRAMES WITH THREE-DIMENSIONAL ELECTROCATALYTIC SURFACES

CROSS REFERENCE TO RELATED APPLICATION

This application claims the benefit of priority of U.S. Provisional Patent Application No. 61/941,832, filed Feb. 19, 2014, which is hereby incorporated by reference herein in its entirety.

STATEMENT OF GOVERNMENT RIGHTS

This invention was made with government support under Contract No. DE-AC02-05CH11231 awarded by the U.S. Department of Energy. The government has certain rights in the invention.

TECHNICAL FIELD

The present invention relates to the field of electrocatalytic materials, and more particularly to electrocatalytic nanoframes and methods and uses thereof.

BACKGROUND

Catalysts based on platinum and other precious metals are highly efficient for harvesting fuels and/or electrons from electrochemical interfaces. Efforts have been focused on the development of electrocatalysts that can meet the demands for high performance while maintaining a minimal precious metal content and cost. However, high content of these costly materials combined with their insufficient activity and durability have been obstacles for their broad deployment in high energy density technologies, such as fuel cells and metal-air batteries.

Alloying platinum with non-noble metals represents an effective approach for the reduction of platinum content in electrocatalysts by increasing the intrinsic activity of the electrocatalysts. While nanoscale electrocatalysts provide substantially enhanced utilization of precious metals, they continue to lack the requisite activity and durability to enable large-scale commercialization of these technologies.

BRIEF DESCRIPTION OF THE DRAWINGS

The present disclosure is illustrated by way of example, and not by way of limitation, in the figures of the accompanying drawings in which like references indicate similar elements.

FIG. 1A shows an illustration of an initial polyhedral nanoparticle and an accompanying micrograph according to an embodiment of the disclosure.

FIG. 1B shows an illustration of an intermediate state of a polyhedral nanoparticle during conversion to a nanoframe and an accompanying micrograph according to an embodiment of the disclosure.

FIG. 1C shows an illustration of a final state of a nanoframe and an accompanying micrograph according to an embodiment of the disclosure.

FIG. 1D shows an illustration of an annealed nanoframe and an accompanying micrograph of the annealed nanoframe on a carbon support according to an embodiment of the disclosure.

FIG. 12A shows oxygen reduction reaction polarization curves of Pt₃Ni nanoframes/C catalysts with and without ionic-liquids according to an embodiment of the disclosure.

FIG. 12B shows oxygen reduction reaction polarization curves of Pt₃Ni nanoframes/C catalysts with ionic-liquids after washing with electrolyte according to an embodiment of the disclosure.

FIG. 12C shows oxygen reduction reaction polarization curves of Pt₃Ni nanoframes/C catalysts with ionic-liquids before an after 10,000 cycles according to an embodiment of the disclosure.

DETAILED DESCRIPTION

Figure 2A:
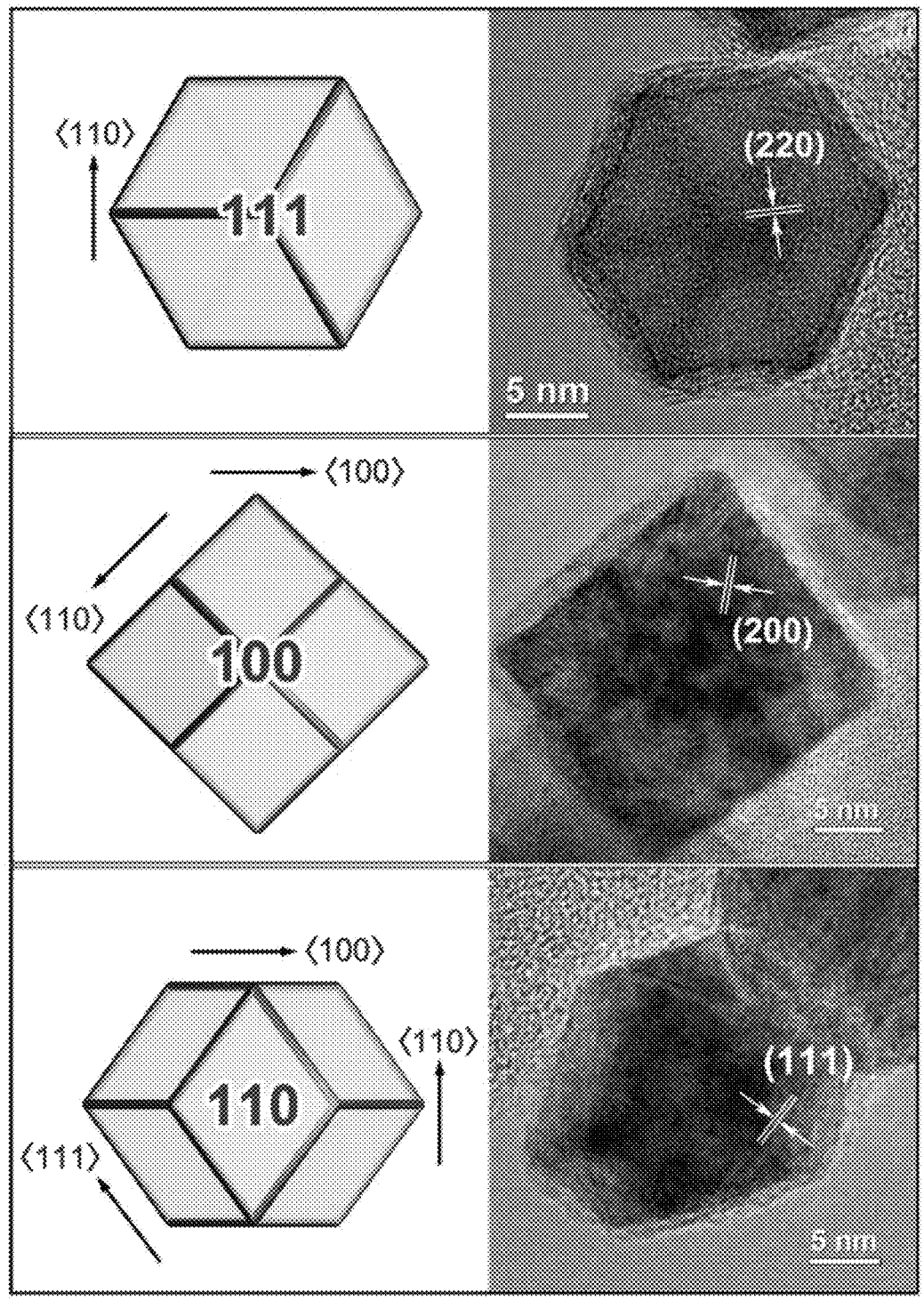
FIG. 2A shows illustrative projections of an initial polyhedral nanoparticle and accompanying micrographs according to an embodiment of the disclosure.

Described herein are nanoframes and methods of producing nanoframes. The embodiments described herein utilize morphological and compositional evolution of solid nanoparticles into durable and highly electrochemically active nanoframes while maintaining size and symmetry. In some embodiments, the nanoframes are crystalline and may be bimetallic or trimetallic. The nanoframes may include catalytic metals, such as platinum, that may be distributed along electrocatalytic, solvent-accessible surfaces. In some embodiments, the resulting nanoframes are exposed to a controlled thermal treatment in order to form Pt-Skin surface structures that exhibit high electrocatalytic activity.

As used herein, the term "nanoframe" refers to a nanostructured material that includes a plurality of interconnected struts arranged to form the edges of a polyhedron, defining a hollow interior volume. An overall surface area to volume ration (surface-to-volume ratio) of the nanoframe is greater than that of an identically shaped polyhedral particle having solid interior volume.

Similar hollow nanostructures have been prepared by other methods, including template-directed synthesis (which are subtractive techniques that rely on the removal of micro-/nano-beads), treatments based on the Kirkendall effect, and/or the galvanic displacement reactions. The embodiments described herein allow for the development of electrocatalysts that have similar structures that, in combination with high surface-to-volume ratios, improve upon currently reported electrochemical activities when integrated into electrochemical devices.

In some embodiments, PtNi₃ polyhedral nanoparticles, which are highly crystalline rhombic dodecahedra, are converted into Pt₃Ni nanoframes that maintain the geometry of the polyhedral nanoparticles. The Pt3Ni nanoframes may have up to 24 remaining edges, in some embodiments, and an eroded interior. The open frame-like structure provides a high surface-to-volume ratio (e.g., ratio of the solvent-accessible or electrocatalytic surface area to the overall volume of the nanoframe) and efficient reactant mass-transport to both the interior and exterior catalytic surfaces composed of the nano-segregated Pt-skin structures. Catalysts based on Pt₃Ni nanoframes, in particular, can achieve over 36 and 21-fold enhancement in mass and specific activities, respectively, for the oxygen reduction in comparison to current Pt/C catalysts. During prolonged exposure to reaction conditions, the structure, overall composition, and functional properties of the nanoframes remain unchanged, demonstrating their high durability.

The embodiments described herein provide several advantages over other catalytic materials and methods of production. A first advantage is the unique geometry and open structure of nanoframes, which addresses some of the major design criteria for advanced nanoscale electrocatalysts, namely high surface to volume ratio, 3-dimensional surface molecular accessibility, and optimal precious metal utilization. Reactant molecules (e.g., $O_2$) can approach the catalytic surfaces of the nanoframes from any direction, thus significantly increasing their functionality. The superior catalytic activity of ionic-liquid encapsulated Pt₃Ni nanoframes along with their minimal precious metal content distinguish them as a highly efficient electrocatalyst that could ultimately drive the wide-spread adoption and integration of renewable energy technologies such as fuel cells and electrolyzers.

A second advantage of the embodiments described herein is that they allow for the spontaneous structural evolution of solid polyhedra into hollow, crystalline nanoframes with controlled size, structure and composition. The embodiments described herein are not limited to any one composition (e.g., PtNi₃ nanoframes), but are compatible with other multimetallic electrocatalytic materials such as PtCo, PtCu, Pt/Rh—Ni, and Pt/Pd—Ni. In some embodiments, preparation of nanoframes can be scaled-up to produce catalysts at the gram-scale.

A third advantage of the embodiments described herein is that they provide a general strategy for the design and synthesis of hollow, open frame, well-defined multimetallic nanomaterials with accessible internal and external surfaces, enabling high electrocatalytic efficiency and maximal utilization of precious metals in materials suitable for energy storage and conversion technologies.

Reference is now made to the accompanying drawings, which provide illustrate the features and advantages of the disclosed embodiments. It is noted that, while $Pt_3Ni$ nanoframes are discussed throughout, $Pt_3Ni$ nanoframes are used to illustrate various aspects of the present embodiments and are not to be construed as limiting.

Figure 2B:
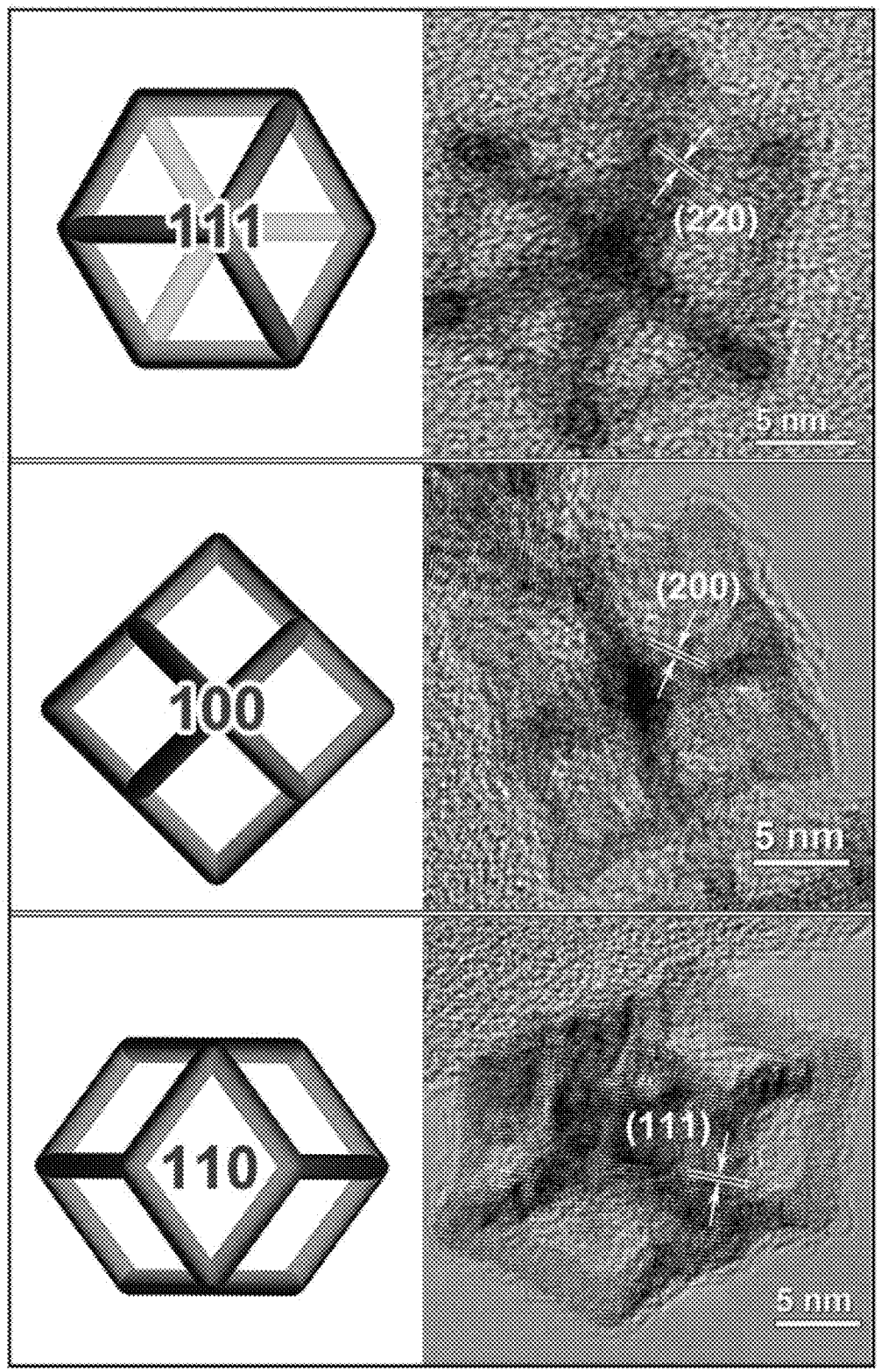
FIG. 2B shows illustrative projections of an final nanoframe and accompanying micrographs according to an embodiment of the disclosure.

FIGS. 1A-1D illustrate the evolution of polyhedral nanoparticles to in accordance with an embodiment of the disclosure. FIG. 1A illustrates a $PtNi_3$ polyhedron and a corresponding micrograph of $PtNi_3$ polyhedra obtained with a transmission electron microscope (TEM). The $PtNi_3$ polyhedra of FIG. 1A have uniform rhombic dodecahedron morphology with single crystallinity, as observed along three representative zone axes in FIGS. 2A and 2B, and the particle sizes were 20.1±1.9 nm. In some embodiments, other particle sizes may be used (e.g., cubic, cuboctahedral, etc.). In some embodiments, the polyhedra, such as those shown in FIGS. 1A, 2A, and 2B are synthesized in oleylamine to produce nanoparticles having surfaces functionalized with oleylamine.

The oleylamine capped $PtNi_3$ polyhedra were dispersed solvents (e.g., hexane and/or chloroform), and maintained under ambient conditions for two weeks, during which the $PtNi_3$ polyhedra were spontaneously converted into $Pt_3Ni$ nanoframes (FIGS. 1C and 2B), with unchanged symmetry and size. As used herein, the term "ambient conditions" refer to atmospheric laboratory conditions having an air pressure within 10% of 101.3 kPa and an overall oxygen content by weight between 18% and 25%. In some embodiments, nanoframes may be formed under different conditions, such as different solvents, temperatures, and time durations. FIGS. 1A-1C show TEM micrographs of three representative stages (0, 6, 12 hours), respectively. The initially solid nanoparticles (FIG. 1A) gradually erode into hollow frames with a compositional change from $PtNi_3$ to $PtNi$ (FIG. 1B), and eventually into $Pt_3Ni$ nanoframes (FIG. 1C). As shown in FIG. 2B, the final $Pt_3Ni$ nanoframe maintains the symmetry and single crystallinity of its parent $PtNi_3$ polyhedron, having a hollow interior and 24 edges (approximately 2 nm in diameter) remaining. In some embodiments, the nanoframes may be further processed. For example, as illustrated and shown in FIG. 1D, after dispersion of $PtNi_3$ nanoframes onto a high surface area carbon support (e.g., Vulcan XC-72) and subsequent thermal treatment between 370° C. and 400° C., the $Pt_3Ni$ nanoframe surfaces tend toward a Pt(111)-skin structure. In some embodiments, the nanoframes may be dispersed on other types of supports, and other annealing temperatures may be used.

Figure 2C:
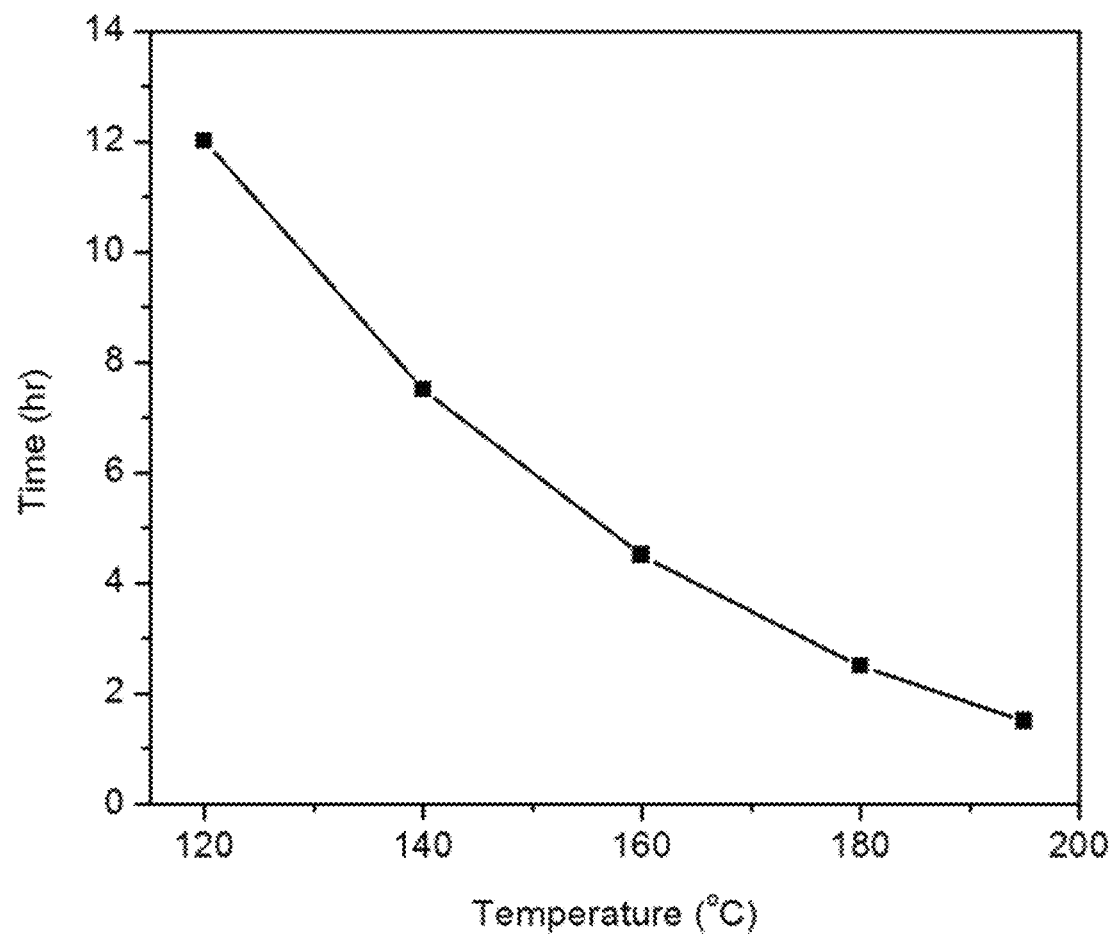
FIG. 2C shows a plot of conversion time versus temperature for conversion of $PtNi_3$ polyhedral nanoparticles to $Pt_3Ni$ nanoframes according to an embodiment of the disclosure.

In some embodiments, increasing the reaction temperature can accelerate the morphological evolution (as shown in FIG. 2C), resulting in formation of nanoframes within 12 hours at 120° C. in some embodiments, or within 2 hours at 180° C.

Figure 3B:
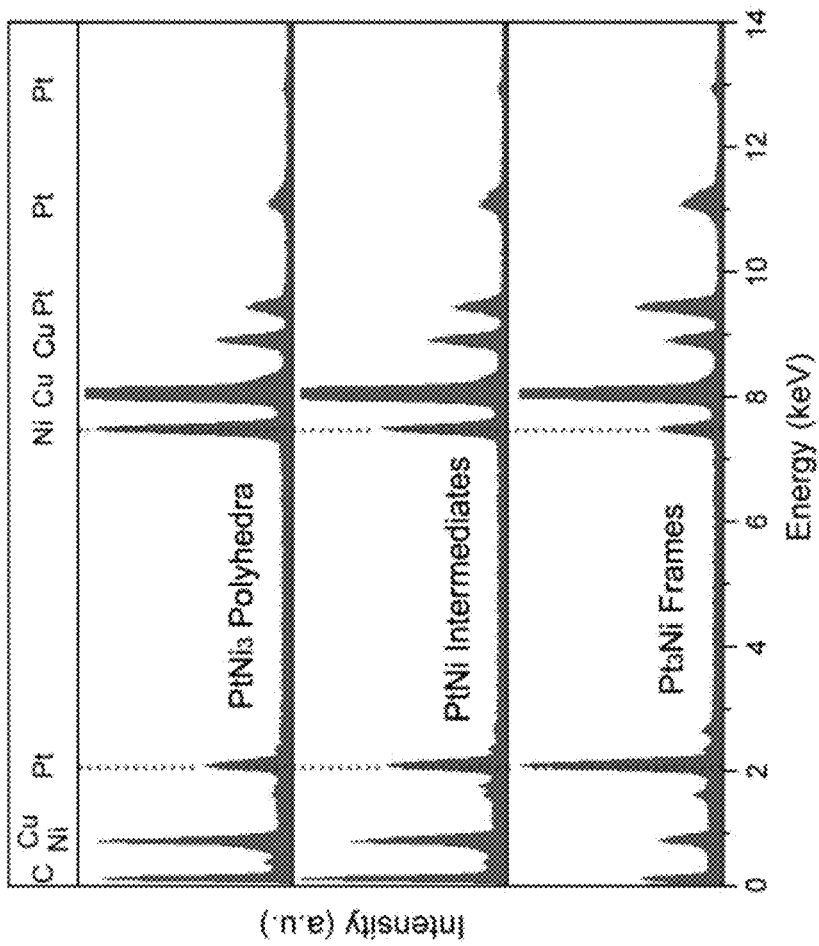
FIG. 3B shows energy dispersive X-ray spectra for three representative stages during the evolution process according to an embodiment of the disclosure.
Figure 3A:
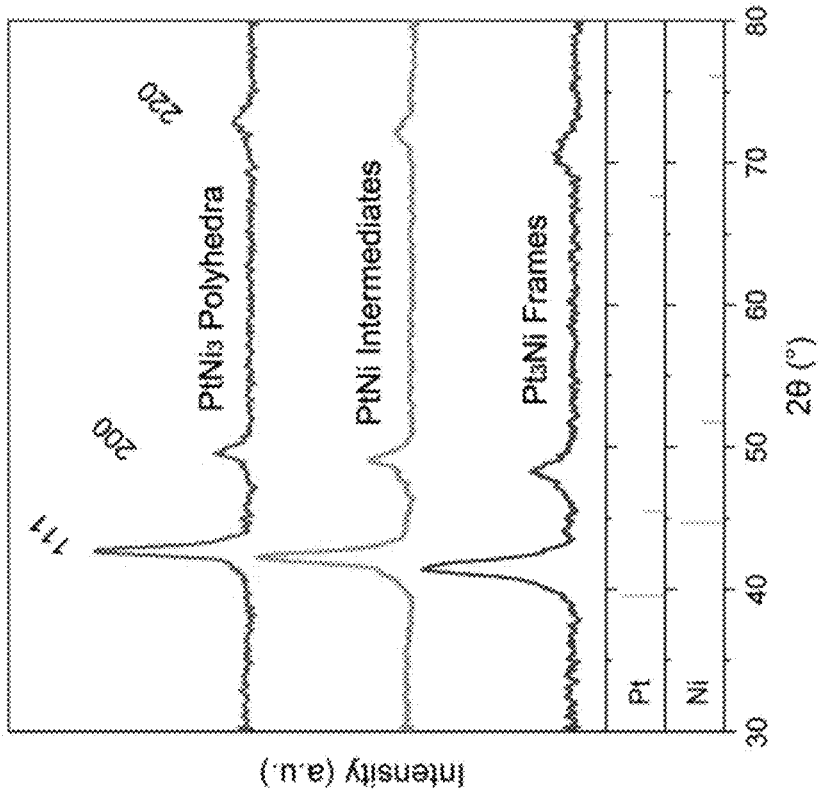
FIG. 3A shows X-ray diffraction patterns of three representative stages during the evolution process according to an embodiment of the disclosure.
Figure 3E:
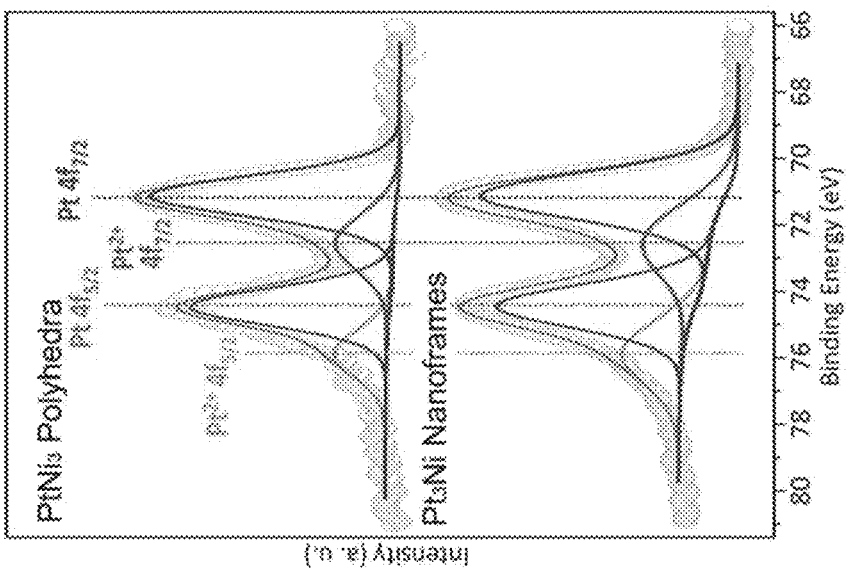
FIG. 3E shows Pt 4f X-ray photoelectron spectra of $PtNi_3$ polyhedral nanoparticles and $Pt_3Ni$ nanoframes according to an embodiment of the disclosure.
Figure 3D:
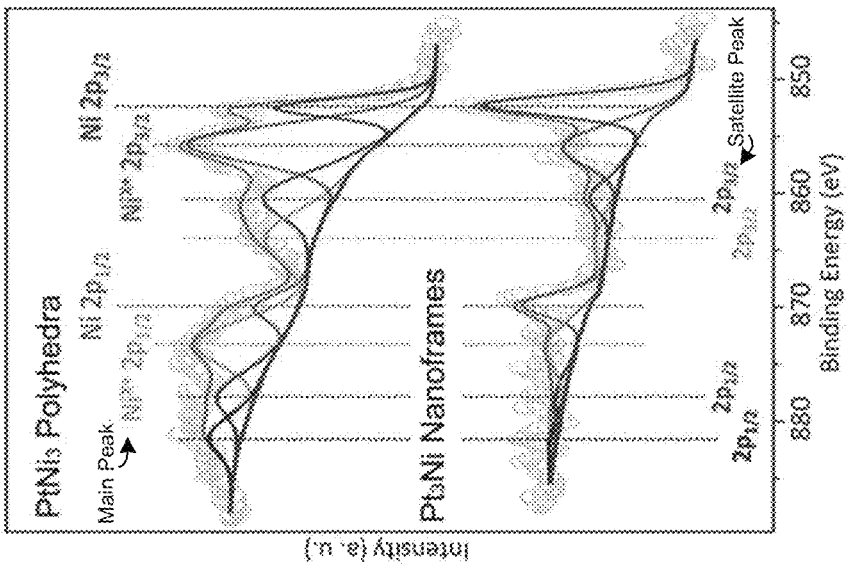
FIG. 3D shows Ni 2p X-ray photoelectron spectra of $PtNi_3$ polyhedral nanoparticles and $Pt_3Ni$ nanoframes according to an embodiment of the disclosure.
Figure 3C:
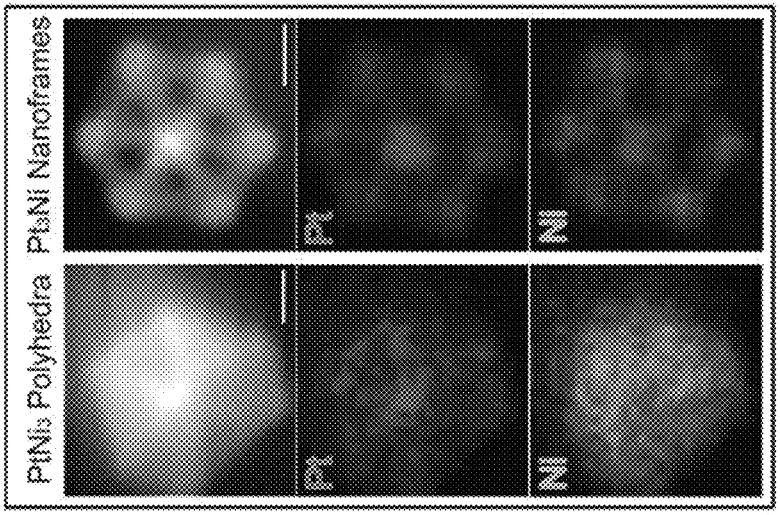
FIG. 3C shows energy dispersive X-ray elemental mapping results for $PtNi_3$ polyhedral nanoparticles and $Pt_3Ni$ nanoframes according to an embodiment of the disclosure.

During the evolution of nanoparticles into nanoframes, the compositional change (e.g., from $PtNi_3$ nanoparticles to $Pt_3Ni$ nanoframes) is evidenced by X-ray diffraction (XRD) patterns and energy dispersive X-ray (EDX) spectra, as shown in FIGS. 3A and 3B, respectively. As shown in FIG. 3A, all three samples are of face-centered-cubic (fcc) phase and three main XRD peaks for each sample, namely, (111), (200) and (220), are located between those for Pt and Ni. During the evolution process, the peaks shift towards lower angles (increased d-spacing), suggesting that the nanostructures have changed from Ni-rich to Pt-rich alloys. As shown in FIG. 3B, the EDX results agree well with this compositional change, as revealed by the increasing peak ratio of Pt over Ni. The molar ratio of Pt/Ni at each stage is calculated to be approximately 1:3 for the initial polyhedra, 1:1 for the intermediate, and 3:1 for the final nanoframes. Elemental analysis was carried out to support the proposed mechanism responsible for the spontaneous structural evolution. FIG. 3C shows EDX elemental mapping results for $PtNi_3$ polyhedron and $Pt_3Ni$ nanoframe, suggesting that Ni is homogeneously distributed whereas Pt in the parent $PtNi_3$ has a slightly higher ratio on the edges (scale bar represents 5 nm). FIGS. 3D and 3E show spectra obtained using X-ray photoelectron spectroscopy (XPS) for Ni 2p and Pt 4f, respectively, of $PtNi_3$ polyhedra and $Pt_3Ni$ nanoframes. These spectra show that during the evolution process, the intensity of $Ni^{x+}$ relative to Ni decreased, whereas the relative ratio of $Pt^{2+}$ to Pt is substantially unchanged.

Figure 3F:
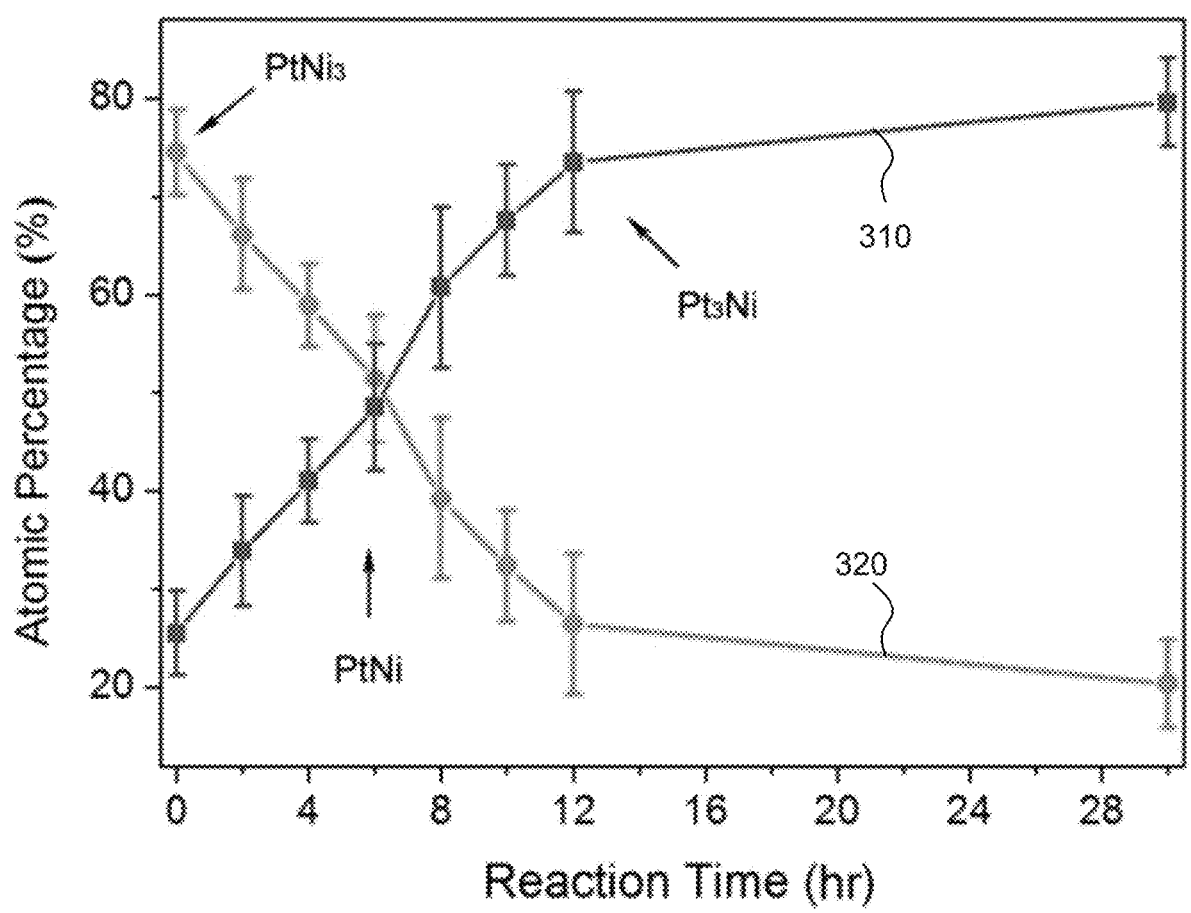
FIG. 3F shows molar ratios of Pt and Ni over time during conversion from $PtNi_3$ polyhedral nanoparticles to $Pt_3Ni$ nanoframes according to an embodiment of the disclosure.

In contrast to other synthesis procedures that involve corrosion induced by etching agents and/or diffusional processes to produce hollow nanostructures, the embodiments described herein allow for the formation of nanoframes (e.g., bimetallic, crystalline nanoframes) to occur spontaneously under ambient conditions at various temperatures. In embodiments that utilize $PtNi_3$ polyhedral nanoparticles as the starting material, it is believed that (without being bound by theory) in the presence of dissolved oxygen (equilibrated from air), the surface Ni atoms are more susceptible to being oxidized than Pt atoms due to the difference in their respective chemical activities. The Ni 2p and Pt 4f XPS spectra of $PtNi_3$ polyhedra obtained in vacuum (Al Kα, hv=1486.6 eV) indicate that the majority of Ni on the surface is in the oxidized state while Pt is mainly in the metallic state, as shown in FIGS. 3D and 3E. Once Ni oxidizes, Ni ions can form soluble metal complexes with surface-functionalized oleylamine ligands. The significantly higher dissolution rate of Ni than that of Pt results in the compositional change from Ni-rich to Pt-rich, until a thermodynamically stable $Pt_3Ni$ phase is formed. FIGS. 3D and 3E also demonstrate that the intensity of $Pt^{2+}$ with respect to Pt is barely altered after the system evolves into the final stage. In contrast, the ratio of $Ni^{x+}$ at the surface decreases significantly, implying that oxidation of Ni on the surface becomes more difficult in the stable $Pt_3Ni$ phase. The composition is stabilized hereafter, as evidenced by FIG. 3F, which shows molar ratios of Pt (concentration plot 310) and Ni (concentration plot 320) over time.

During the morphological evolution from nanoparticles to nanoframes, the dissolution may take place preferentially in the interior of the nanoparticles rather than on their edges. This may occur, for example, as a result of an inhomogeneous elemental distribution of the nanoparticles. For example, in some embodiments, each nanoparticle may include a first metal (e.g., Pt) and a second metal (e.g., Ni), and a mass ratio of the first metal to the second metal decreases along a radial direction from an outer surface of the nanoparticle to a center of the nanoparticle (e.g., a Pt concentration decreases with respect to a Ni from the outer surface of the nanoparticle to the center of the nanoparticle). In some embodiments, the mass ratio vary continuously. In some embodiments, the nanoparticles may be core-shell particles such that an alloy material forms the outer shell (e.g., a $PtNi_3$ outer shell), and a single metal or alloy material forms the inner core (e.g., a Ni or $Pt_3Ni$ inner core). The inhomogeneous distribution of metals in $Pt_3Ni$ nanoframes is observed in FIG. 3C, where the contours of nanoframes are visible after synthesis due to higher Pt content on the edges. This is confirmed by EDX elemental mapping (FIG.

Figure 4A:
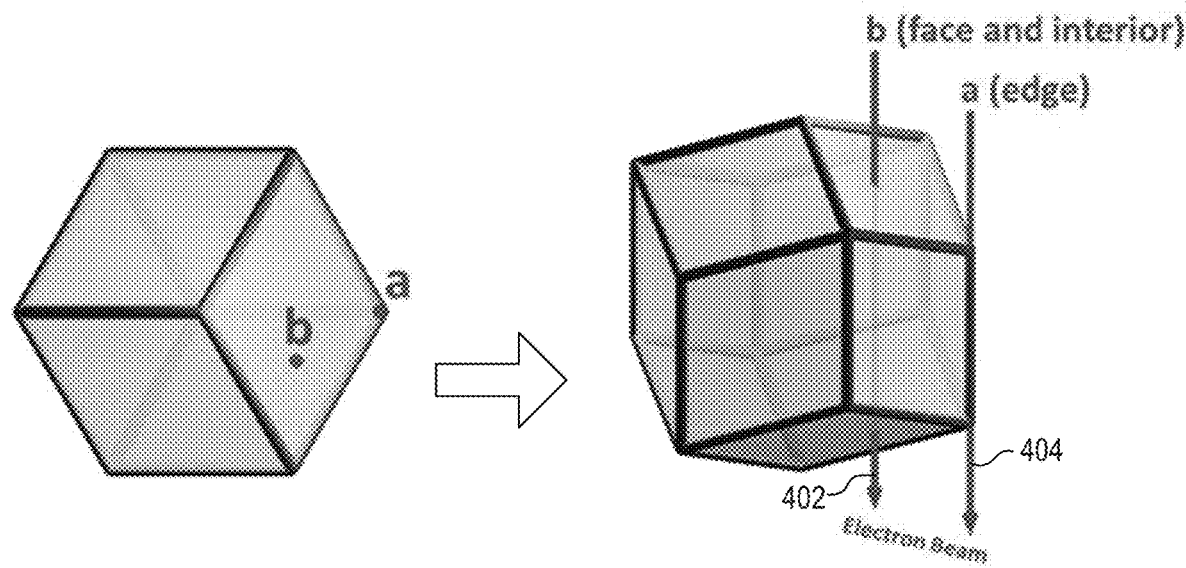
FIG. 4A illustrates beam paths from energy dispersive X-ray analysis performed on nanoparticles and nanoframes according to an embodiment of the disclosure.

3C) and site-specific EDX analyses (FIG. 4A) for the PtNi$_3$ polyhedra where Ni exhibits a relatively homogeneous distribution inside of particle, while Pt preferentially occupies the edges. In FIG. 4A, the EDX beam size for both beam path 402 and beam path 404 was 1 nm, which is comparable to the size of the particle edges (2 nm). An atomic % of Pt at the edge (beam path 404) is 28.3±4.9%, 51.2±8.1%, and 73.5±7.2% for PtNi$_3$ polyhedra, PtNi intermediates, and Pt$_3$Ni nanoframes, respectively. An atomic % of Pt at the face and interior (beam path 402) was 13.4±4.8% and 26.3±7.0% for PtNi$_3$ polyhedra and PtNi intermediates, respectively.

Figure 4B:
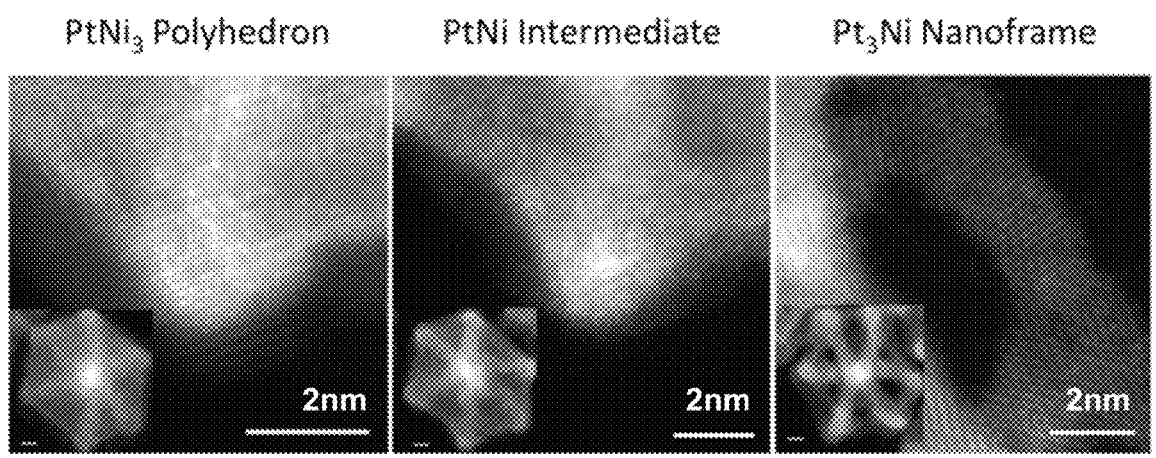
FIG. 4B shows atomic resolution images of three representative stages of the conversion of nanoparticles into nanoframes according to an embodiment of the disclosure.

Driving forces for such elemental distributions may be based on different nucleation rates between Pt and Ni during initial seed growth into polyhedral nanoparticles. During the evolution process of a nanoparticle, this may lead to stable Pt$_3$Ni phase formation on the edges, as both Pt and Ni species dissolve in the interior of the nanoparticle, i.e., owing to a low ratio of Pt to Ni. Taken together, the inhomogeneous distribution of Pt and the high dissolution rate of Ni results in the formation of the bimetallic, crystalline Pt$_3$Ni nanoframe morphologies containing 24 edges (each being approximately 2 nm in diameter) that retain high crystallinity of the parent structure (FIG. 4B). FIG. 4B shows high-angular dark field scanning tunneling electron microscope (HAADF-STEM) images of samples at three representative stages, indicating that the Pt ratio is higher on the edge than that in the interior (for the initial PtNi$_3$ precursor particles and PtNi intermediates), while the Pt$_3$Ni product exhibits a homogeneous distribution of both Pt and Ni (in contrast to the PtNi$_3$ solid polyhedral).

The electrocatalytic properties of Pt$_3$Ni nanoframes were evaluated and compared to solid PtNi nanocrystals and current Pt/C nanoscale electrocatalysts (FIGS. 5A-5F). The polarization curves shown in FIG. 5B demonstrate that oxygen reduction reaction (ORR) activities increase in the following order: Pt/C (plot 502)<solid PtNi (plot 504) <<Pt$_3$Ni nanoframes (plot 506). As shown in the Tafel plot of FIG. 5C, Pt$_3$Ni nanoframes (plot 512) are compared to solid PtNi/C nanoparticles (plot 514) and Pt/C (plot 510). The Pt$_3$Ni nanoframes (plot 512) exhibit substantially higher activity with a slope of 46 mV dec$^{-1}$ compared to that of 73 mV dec$^{-1}$ for Pt/C (plot 510), which is in agreement with that of a Pt$_3$Ni(111)-Pt-skin. The kinetic current densities representing the intrinsic activities are calculated by Koutecky-Levich equation and summarized in FIGS. 5D and 5E as specific and mass activities, respectively.

Figure 5B:
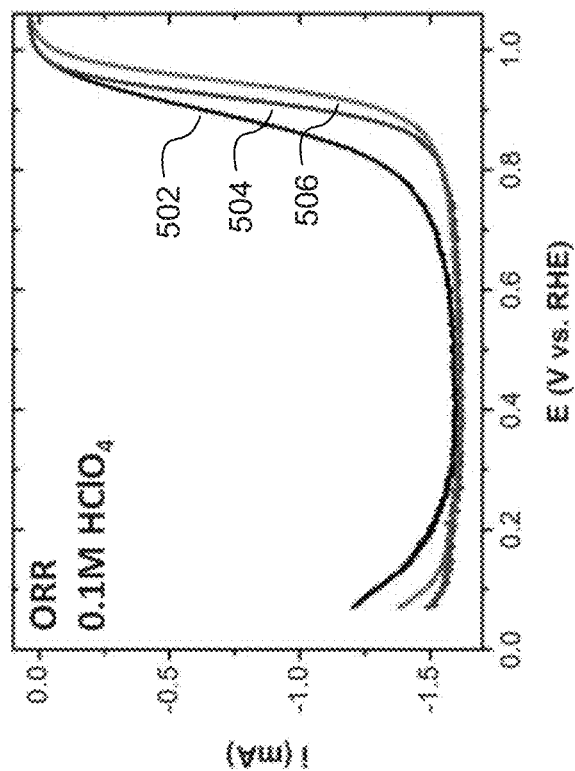
FIG. 5B shows oxygen reduction reaction polarization curves according to an embodiment of the disclosure.
Figure 5A:
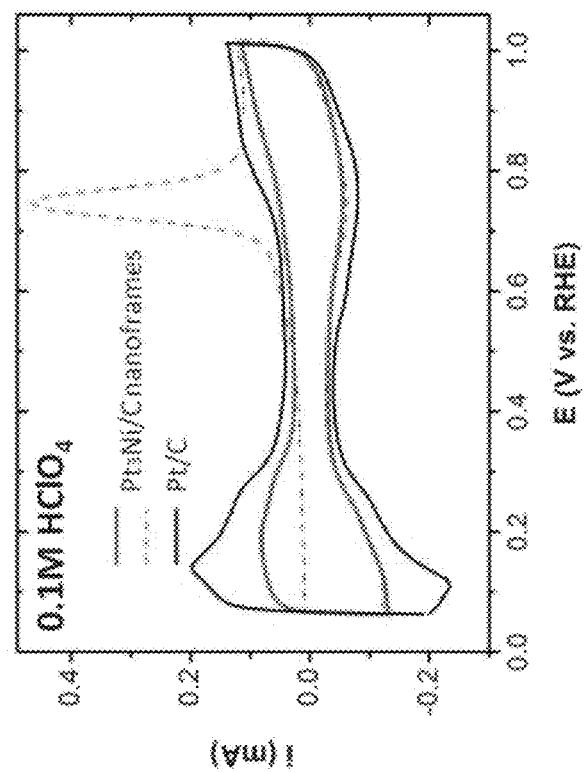
FIG. 5A shows cyclic voltammogram and carbon monoxide stripping curves of $Pt_3Ni$ nanoframes according to an embodiment of the disclosure.
Figure 5D:
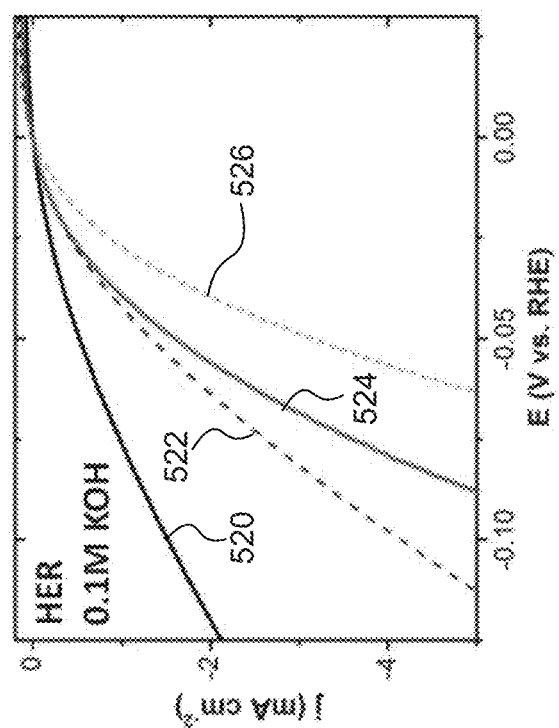
FIG. 5D shows hydrogen evolution reaction activities for Pt/C, Pt/Ni(OH)$_2$/C, Pt$_3$Ni nanoframes/C, and Pt$_3$Ni nanoframes/Ni(OH)$_2$/C catalysts according to an embodiment of the disclosure.
Figure 5C:
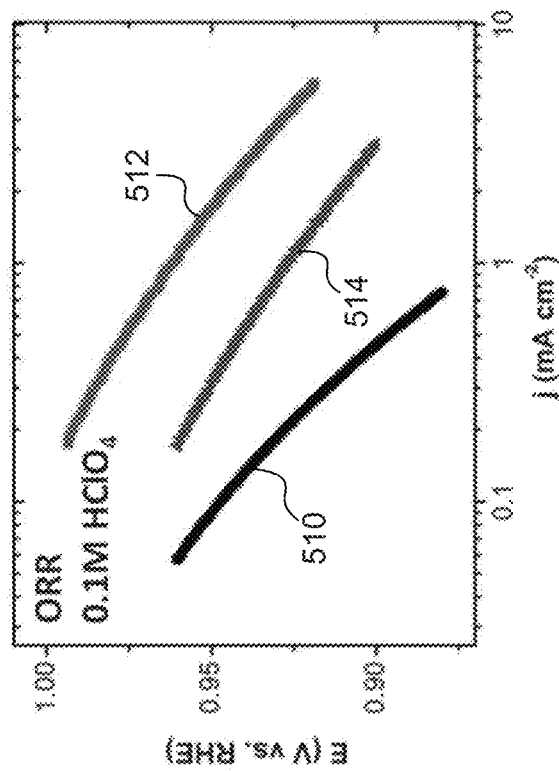
FIG. 5C shows a Tafel plot for the oxygen reduction reaction polarization curves of FIG. 5B according to an embodiment of the disclosure.

FIG. 5D shows hydrogen evolution reaction (HER) activities for Pt/C (plot 520), Pt/Ni(OH)$_2$/C (plot 522), Pt$_3$Ni nanoframes/C (plot 524), and Pt$_3$Ni frames/Ni(OH)$_2$/C (plot 526) in alkaline electrolyte. FIG. 5E shows HER polarization curves on Pt/C, 4 nm near-spherical PtNi/C, and Pt$_3$Ni nanoframes/C catalysts, as well as Ni(OH)$_2$-modified Pt/C and Pt$_3$Ni nanoframes/C catalysts. The activities at −0.1 V and improvement factors vs. Pt/C, respectively, for each curve were 1.519 and 1.00 for Pt/C, 3.665 and 2.41 for 4 nm near-spherical PtNi/C, 4.121 and 2.71 for Ni(OH)$_2$-modified Pt/C, 6.529 and 4.30 for Pt$_3$Ni nanoframes/C, and 12.579 and 8.28 for Ni(OH)$_2$-modified Pt$_3$Ni nanoframes/C. Due to the high intrinsic activity of the Pt$_3$Ni nanoframes, measurements were obtained at 0.95 V to avoid substantial error margin introduced by the close proximity of current values at 0.9 V to diffusion limited current. The specific activities are calculated through normalization by the electrochemically active surface area (ECSA) estimated by electrooxidation of adsorbed carbon monoxide (CO) stripping. A ratio between ECSA values determined by CO stripping and underpotentially deposited hydrogen (H$_{upd}$) was found to be greater than 1.5 for the Pt$_3$Ni nanoframes (versus 1.25 for 5 nm solid PtNi nanoparticles, and 1.00 for Pt/C), strongly suggesting formation of a Pt-skin terminated (111)-like surface structure (FIG. 5A). The ECSA of the nanoframes was determined by integrated charge of the adsorbed CO electro-oxidation curve of FIG. 5A.

It has been demonstrated previously that electrochemically deposited Ni(OH)$_2$ clusters on Pt surfaces can facilitate dissociation of water, thus significantly boosting HER activity. In the case of crystalline Pt$_3$Ni—Pt-Skin nanoframe surfaces modified by electrochemically deposited Ni(OH)$_2$ clusters (FIGS. 5D and 5G), the HER activity is enhanced by almost one order-of-magnitude compared to Pt/C. For example, FIG. 5G shows HER activity for Pt/C (plot 530), PtNi nanocrystals/C (plot 532), Ni(OH)$_2$-modified Pt/C (plot 534), Pt$_3$Ni nanoframes/C (plot 536), and Ni(OH)$_2$-modified Pt$_3$Ni nanoframes/C (plot 538). These results further emphasize the beneficial effects in employment of the open architecture and surface compositional profile of the Pt$_3$Ni nanoframes in electrocatalysis.

Figure 5F:
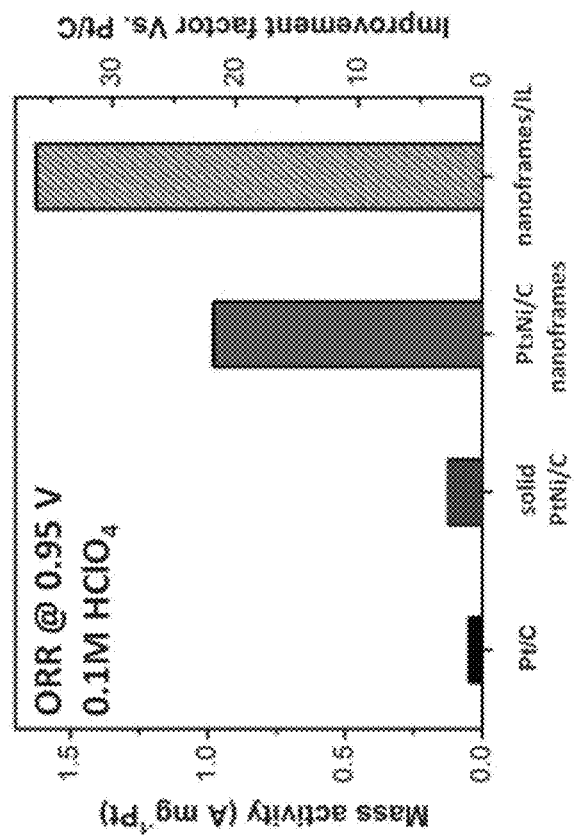
FIG. 5F shows mass activities and improvement factors for various catalysts versus Pt/C according to an embodiment of the disclosure.
Figure 5E:
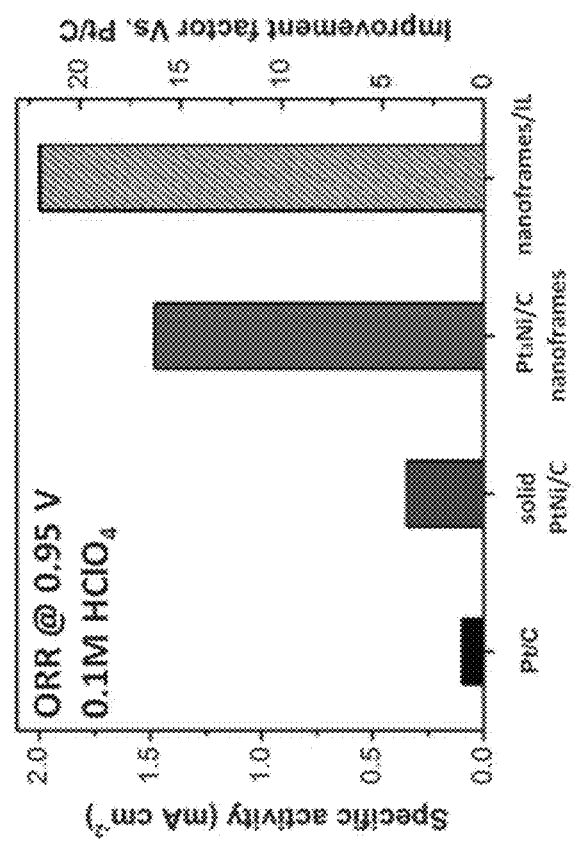
FIG. 5E shows specific activities and improvement factors for various catalysts versus Pt/C catalysts according to an embodiment of the disclosure.
Figure 5G:
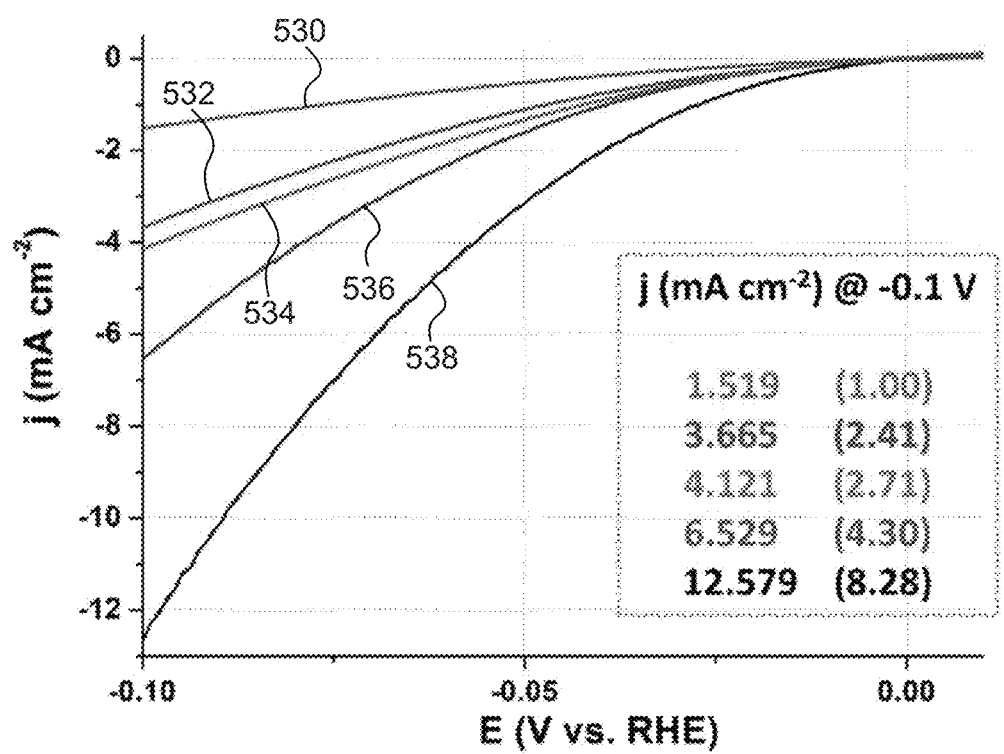
FIG. 5G shows hydrogen evolution reaction activities for Pt/C, Pt/Ni(OH)$_2$/C, Pt$_3$Ni nanoframes/C, and Pt$_3$Ni nanoframes/Ni(OH)$_2$/C catalysts according to an embodiment of the disclosure.

The specific activity of Pt$_3$Ni nanoframes exhibits an improvement factor of over 16 versus commercial Pt/C electrocatalysts, while the mass activity of the Pt$_3$Ni nanoframes achieves at least a 21-fold enhancement, demonstrating that Pt$_3$Ni nanoframes are a highly efficient electrocatalyst for the ORR (FIG. 5F). If calculated at 0.9 V, the mass activity of Pt$_3$Ni nanoframes (5.7 A mg$^{-1}$Pt) is over one order of magnitude higher than the US Department of Energy's 2017 target. This extraordinarily high intrinsic activity of the Pt$_3$Ni nanoframes combined with distinct ratio between ECSA$_{CO}$/ECSA$_{Hupd}$ is indicative of a Pt$_3$Ni—Pt-skin formation, mimicking the nano-segregated concentration profile and structure of an ideal Pt$_3$Ni(111) surface. The Pt-skin surface structure of the nanoframes, in conjunction with their high ECSA, provide a link between well-defined extended surfaces and highly crystalline nanoscale electrocatalysts. The high mass activity results from the synergy between intrinsic activity and the open architecture of the Pt$_3$Ni nanoframes with ultra-thin edges (approximately 2 nm in diameter) that enables access of reactants to both the internal and external surfaces.

Table 1 shows calculations of surface area (A), volume (V), and surface-to-volume ratios (A/V) of a sphere morphology, a cuboctahedron morphology, solid rhombic dodecahedron morphology, and a nanoframe morphology evolved from a solid rhombic dodecahedron. The two bottom rows correspond to surface areas of PtNi spherical nanocrystals with a diameter of 4 nm, Pt cuboctahedra with an edge length of 7 nm, PtNi$_3$ solid rhombic dodecahedra with an edge length of 10 nm, and Pt$_3$Ni nanoframes with an edge length of 10 nm. The theoretical surface areas are predicted from the surface area experimentally measured for Pt$_3$Ni nanoframes and the respective A/V$_{Pt}$ ratio of each morphology. The experimentally measured surface areas were obtained by electrochemical evaluation in accordance with the embodiments described herein. The experimentally measured surface areas are in good agreement with the theoretical surface areas, and are likely lower than the theoretical surface areas due to surface area restrictions as a result of particles being deposited on a surface.

TABLE 1

Surface Area of Various Particle Morphologies

| | Sphere | Cuboctahedron | Solid Rhombic Dodecahedron | Nanoframe (from Rhombic Dodecahedron) |
|---|---|---|---|---|
| Area (A) | $4\pi r^2$ | $(6 + 2\sqrt{3})a^2$ | $8\sqrt{2}a^2$ | $24\pi da^2$ |
| Volume (V) | $\frac{4}{3}\pi r^3$ | $\frac{5}{3}\sqrt{2}\,a^3$ | $\frac{16}{9}\sqrt{3}\,a^3$ | $6\pi a d^2$ |
| A/V | $1.2\ nm^{-1}$ | $0.574\ nm^{-1}$ | $0.367\ nm^{-1}$ | $2\ nm^{-1}$ |
| $A/V_{Pt}$ | $2.070\ nm^{-1}$ | $0.574\ nm^{-1}$ | $1.165\ nm^{-1}$ | $2.483\ nm^{-1}$ |
| Surface Area (Experimental) | $33.8\ m^2g^{-1}$ Pt | $14.5\ m^2g^{-1}$ Pt | $26.4\ m^2g^{-1}$ Pt | $67.2\ m^2g^{-1}$ Pt |
| Surface Area (Theoretical) | $56.0\ m^2g^{-1}$ | $15.5\ m^2g^{-1}$ | $31.5\ m^2g^{-1}$ | $67.2\ m^2g^{-1}$ |

Figure 6A:
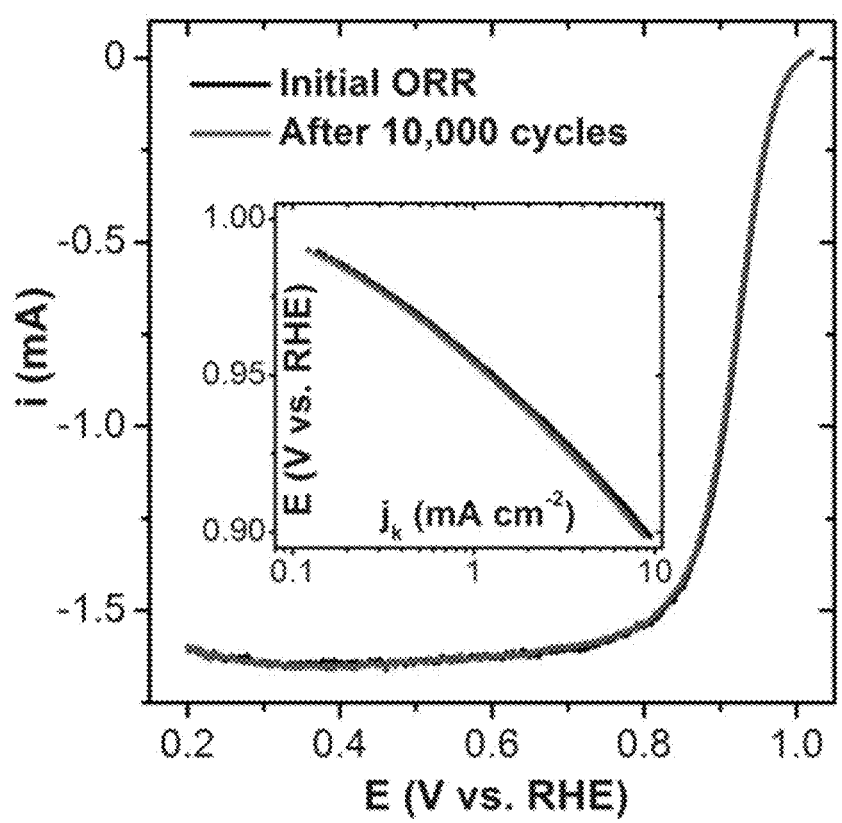
FIG. 6A shows oxygen reduction reaction polarization curves and a corresponding Tafel plot insent for Pt$_3$Ni nanoframes before and after 10,000 cycles according to an embodiment of the disclosure.
Figure 6B:
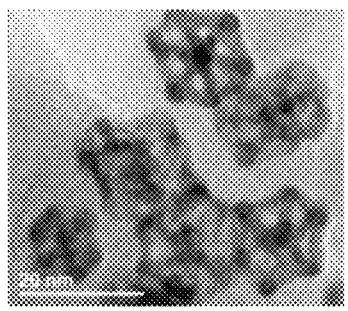
FIG. 6B is a bright-field micrograph of Pt$_3$Ni nanoframes after 10,000 cycles according to an embodiment of the disclosure.
Figure 6C:
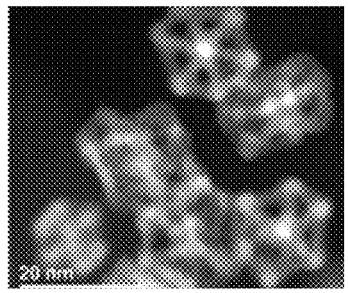
FIG. 6C is a dark-field micrograph of Pt$_3$Ni nanoframes after 10,000 cycles according to an embodiment of the disclosure.
Figure 6D:
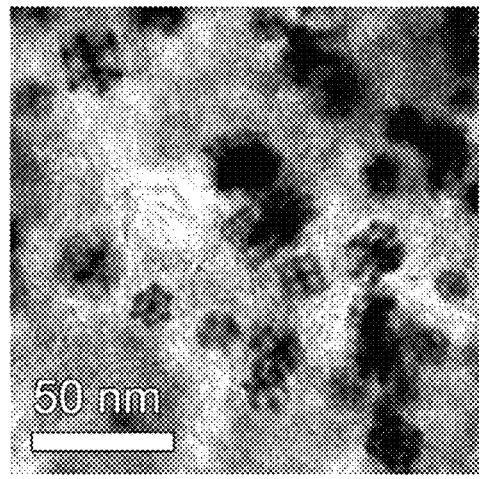
FIG. 6D is a micrograph of Pt₃Ni nanoframes/C catalysts after annealing according to an embodiment of the disclosure.

In addition to the high intrinsic activity, Pt$_3$Ni nanoframes exhibit high stability during electrochemical operation. The stability of the Pt$_3$Ni nanoframes was assessed by cycling the potential between 0.6 V and 1.0 V at different sweep rates between 2-200 mV s$^{-1}$ for a duration of 10,000 cycles. For the Pt/C electrocatalysts, such cycles cause dissolution of Pt surface atoms and agglomeration of Pt particles through surface oxidation/reduction processes. However, as shown in the Tafel plot of FIG. 6, after 10,000 cycles, the current density drop for Pt$_3$Ni nanoframes is negligible. FIG. 6 also shows TEM and STEM (dark field and bright field) images of Pt$_3$Ni nanoframes after potential cycling, confirming that the frame structure is preserved. The thermal stability of Pt$_3$Ni nanoframes was further examined by annealing at 400° C. for several hours. As shown in FIG. 6D, the frame structure is retained after the thermal treatment (annealing at 400° C.), confirming that the Pt$_3$Ni nanoframe is thermodynamically equilibrated and stable.

Figure 7A:
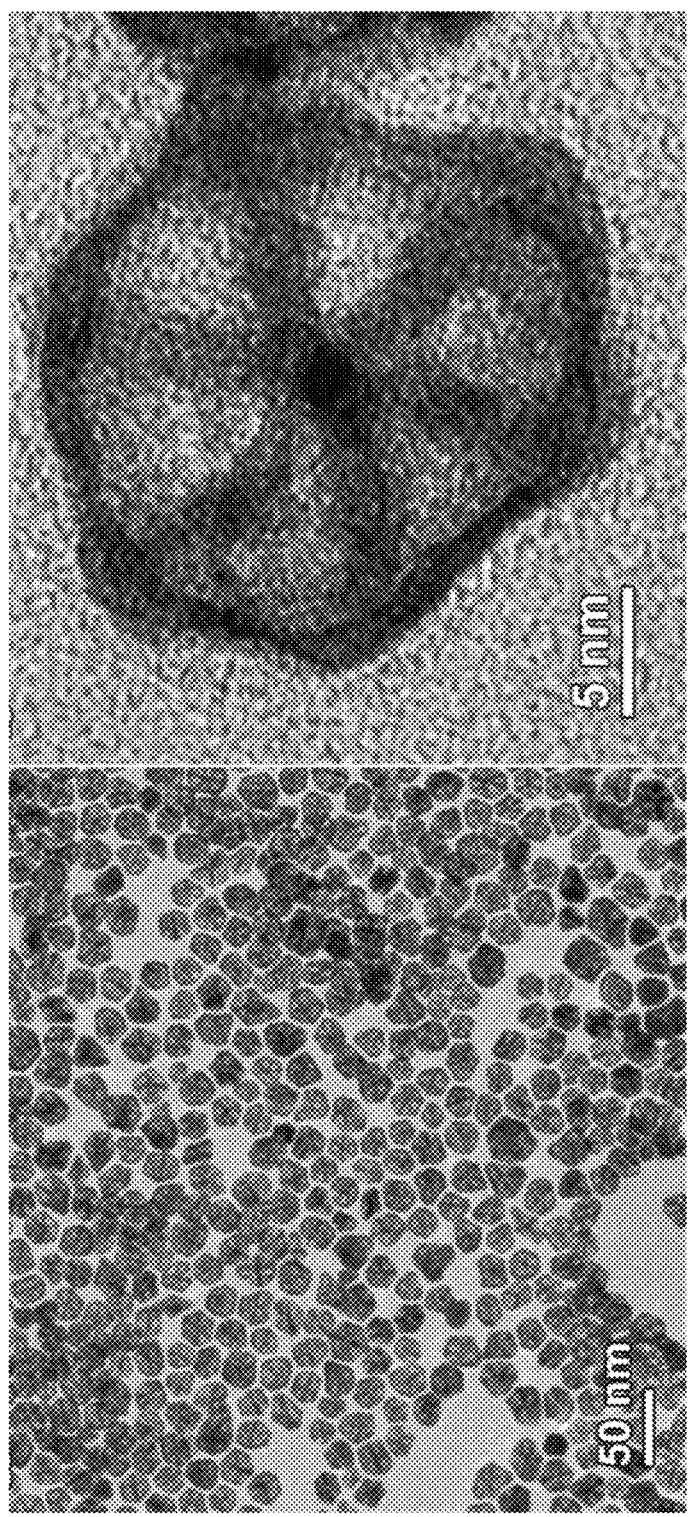
FIG. 7A shows micrographs of nanoframes formed from a PtCo bimetallic system according to an embodiment of the disclosure.
Figure 7B:
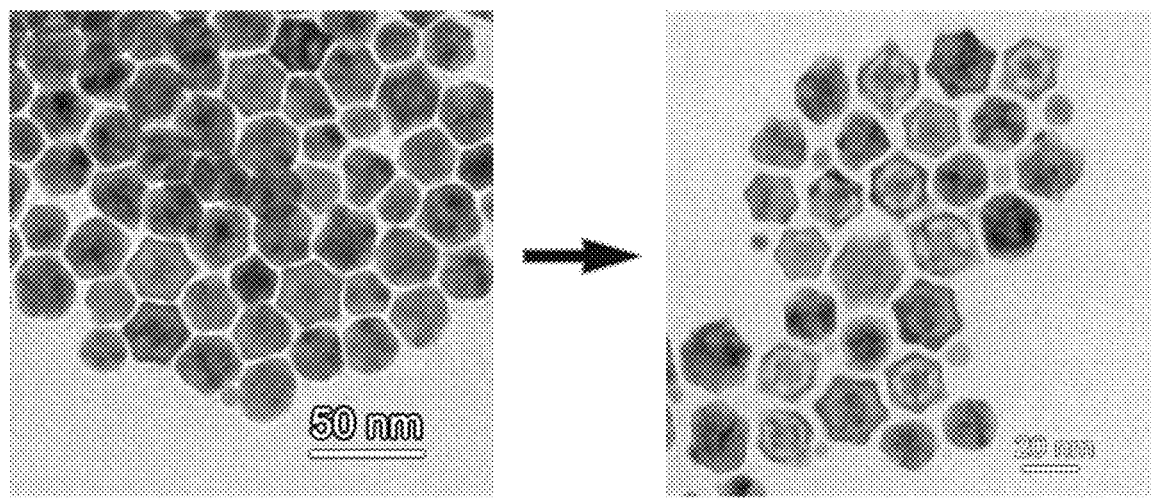
FIG. 7B shows micrographs demonstrating the structural evolution observed in PtCu bimetallic systems from solid nanoparticles to nanoframes according to an embodiment of the disclosure.
Figure 7C:
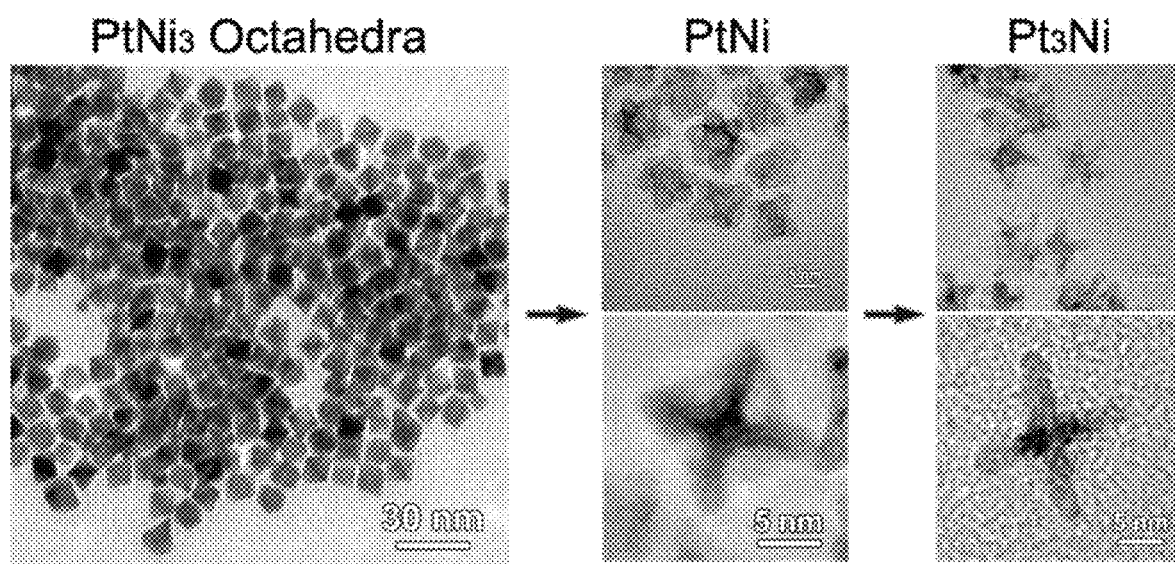
FIG. 7C shows micrographs demonstrating the structural evolution of PtNi₃ octahedra into PtNi concave octahedral and finally into Pt₃Ni hexapods according to an embodiment of the disclosure.
Figure 7D:
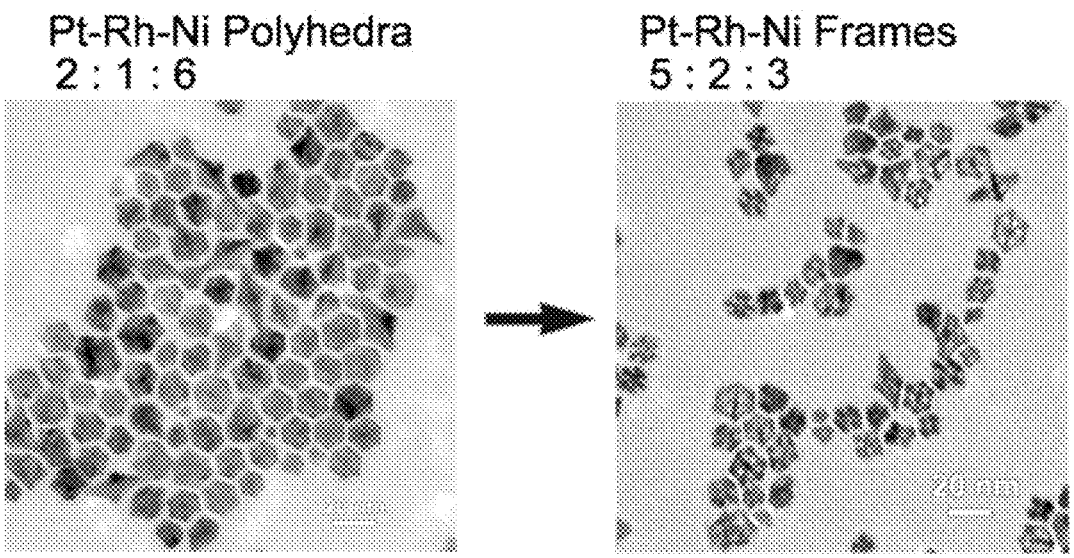
FIG. 7D shows micrographs of ternary metallic systems of Pt—Rh—Ni according to an embodiment of the disclosure.
Figure 7E:
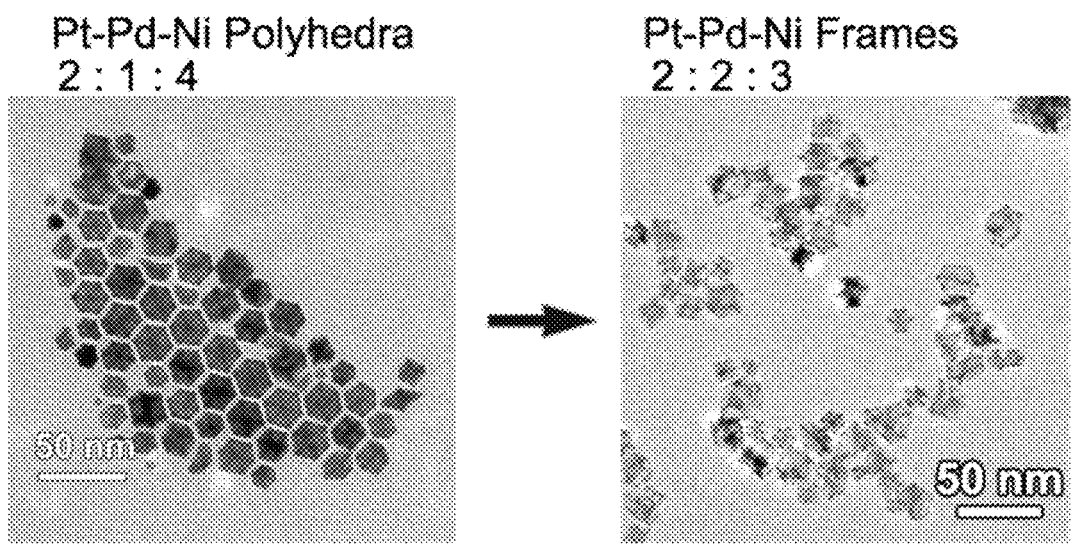
FIG. 7E shows micrographs of ternary metallic systems of Pt—Pd—Ni according to an embodiment of the disclosure.

In some embodiments, different compositions and morphologies/geometries may be produced, such as other multimetallic nanoframes (e.g., two or more metals). FIG. 7A is a transmission electron microscopy image of a nanoframe formed from a PtCo bimetallic system. FIG. 7B shows TEM images demonstrating the structural evolution observed in PtCu bimetallic systems from solid nanoparticles to nanoframes. FIG. 7C shows TEM images demonstrating the structural evolution of PtNi$_3$ octahedra into PtNi concave octahedral and finally into Pt$_3$Ni hexapods. FIGS. 7D and 7E show TEM images of ternary metallic systems of Pt—Rh—Ni and Pt—Pd—Ni alloys, respectively, evolving from solid rhombic dodecahedra into nanoframes, with the sizes and geometry preserved while chemical are compositions are altered.

Figure 8:
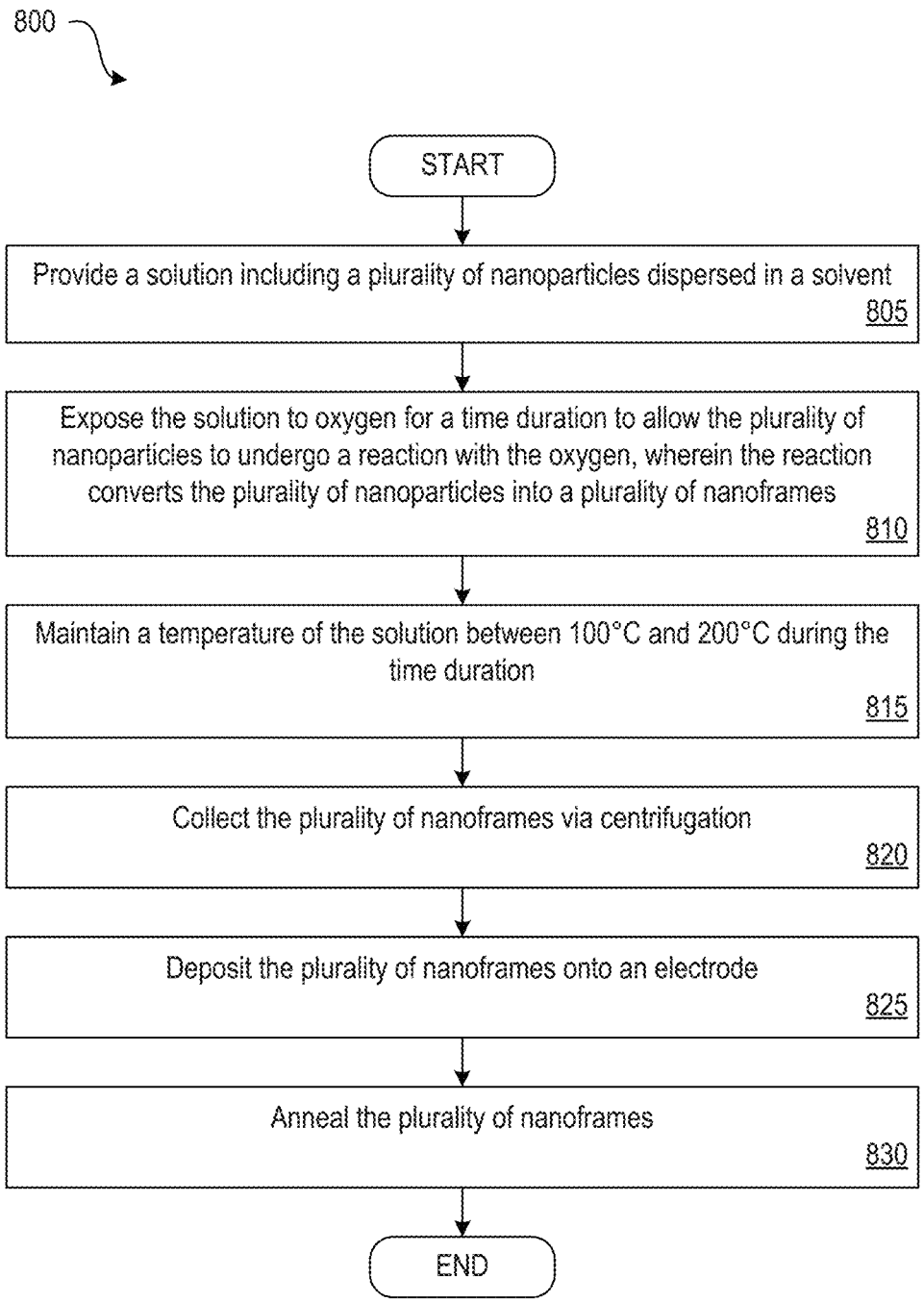
FIG. 8 is a flow chart illustrating a method for producing nanoframes according to van embodiment of the disclosure.

FIG. 8 is a flow chart illustrating a method 800 for producing nanoframes according to an embodiment of the disclosure. Method 800 may be performed to produce any of the nanoframes described herein (e.g., Pt$_3$Ni nanoframes).

Referring now to FIG. 8, at block 805, a solution is provided that includes a plurality of nanoparticles dispersed in a solvent. In one embodiment, one or more of the plurality of nanoparticles is composed of a first metal and a second metal. In some embodiments, one or more of the plurality of nanoparticles contains additional metals. For example, the nanoparticles may each have a composition of a form of X$_n$Y$_m$, where X is Pt, Pd, Rh, Au, or a different metal, and Y is Ni, Cu, Co, or a different metal. In some embodiments, X is a metal selected from a first group consisting of Pt, Pd, Rh, and Au, and wherein Y is a metal selected from a second group consisting of Ni, Cu, and Co. In one embodiment, one or more nanoparticles of the plurality of nanoparticles are PtNi$_3$ nanoparticles. In one embodiment, the plurality of nanoparticles include one or more of cubic nanoparticles, cuboctahedral nanoparticles, or solid rhombic dodecahedral nanoparticles. In one embodiment, the plurality of nanoparticles are functionalized with oleylamine ligands. In one embodiment, the solvent is an organic solvent (e.g., hexane, chloroform, or any other suitable solvent). In some embodiments, the plurality of nanoparticles is a mixture of nanoparticles having different compositions, morphologies, and or geometries.

At block 810, the solution is exposed to oxygen for a time duration to allow the plurality of nanoparticles to undergo a reaction with the oxygen such that the reaction converts the plurality of nanoparticles into a plurality of nanoframes. For example, in some embodiments, the time duration ranges from 2 hours to 18 hours. In some embodiments, the time duration ranges from 10 hours to 14 hours. In some embodiments, the time duration is 12 hours. In some embodiments, an oxygen gas flow may be introduced into the solution. In some embodiments, the solution may be exposed to a gas that contains oxygen (e.g., ambient air), and the oxygen may diffuse into the solution via an air-liquid interface.

In one embodiment, one or more of the nanoframes are Pt$_3$Ni nanoframes. In one embodiment, a first mass percent of the first metal is greater than a second mass percent of the second metal prior to exposing the solution to the oxygen-containing gas, and wherein the first mass percent of the first metal is less than the second mass percent of the second metal after the time duration.

In one embodiment, a first metal is present in each of the plurality of nanoparticles at a first mass percent (e.g., Pt at approximately 30%) and in each of the plurality of nanoframes at a second mass percent (e.g., Pt at approximately 70%), and a second metal is present in each of the plurality of nanoparticles at a third mass percent (e.g., Ni at approximately 70%) and in each of the plurality of nanoframes at a fourth mass percent (e.g., Ni at approximately 30%). The first mass percent is less than the third mass percent, and wherein the second mass percent is greater than the fourth mass percent. In one embodiment, one or more of the plurality of nanoframes have a composition of a form of X$_n$Y$_m$, where X is Pt, Pd, Rh, Au, or a different metal, and wherein Y is Ni, Cu, Co, or a different metal. In one embodiment, one or more of the plurality of nanoframes have a composition of a form of X$_n$Y$_m$, wherein X is a metal selected from a first group consisting of Pt, Pd, Rh, and Au, and wherein Y is a metal selected from a second group consisting of Ni, Cu, and Co.

In one embodiment, at least one nanoframe of the plurality of nanoframes is a bimetallic nanoframe having a ratio of electrochemically-active surface-to-volume that is greater than 1 $nm^{-1}$. In one embodiment, the ratio of electrochemically-active surface-to-volume is greater than 2 $nm^{-1}$. In one embodiment, the ratio of electrochemically-active surface-to-volume is greater than 2 $nm^{-1}$ and less than 5 $nm^{-1}$. In one embodiment, the bimetallic nanoframe includes Pt at a concentration of greater than 60% by weight of the bimetallic nanoframe. In one embodiment, the electrochemically-active surface area is formed by a portion of the Pt present as a skin structure (e.g., a Pt(111)-skin structure).

At block 815, a temperature of the solution is maintained between 100° C. and 200° C. during the time duration. In other embodiments, the temperature may be less than 100° C. (e.g., room temperature between), or greater than 200° C. In some embodiments, the temperature may be held at a fixed temperature, or varied over the time duration.

At block 820, the plurality of nanoframes are collected via centrifugation. In some embodiments, the centrifugation speed is between 4000 rpm and 6000 rpm.

At block 825, the plurality of nanoframes are deposited onto an electrode. For example, in some embodiments, the plurality of nanoframes are incorporated in a carbon support to form a catalyst (e.g., as is described with respect to Example 6 below). In some embodiments, the plurality of nanoframes may be incorporated into an ink, which may be deposited onto the electrode. In some embodiments, the electrode is a glassy carbon electrode. In some embodiments, the electrode is an $Ni(OH)_2$-modified electrode.

In one embodiment, the plurality of nanoframes are disposed on a solvent-accessible surface of the electrode, and average solvent-accessible surface area of the plurality of nanoframes is greater than 50 $m^2/g$. In one embodiment, the average solvent-accessible surface area is greater than 60 $m^2/g$. In one embodiment, a mass activity of the electrode is greater than 5 A $mg^{-1}$ Pt at 0.9 V when the electrode is incorporated into an electrochemical cell.

At block 830, the plurality of nanoframes are annealed. In some embodiments, the plurality of nanoframes are annealed after depositing onto the electrode. In other embodiments, the plurality of nanoframes are annealed prior to depositing onto the electrode (e.g., before or after incorporating onto a support). In some embodiments, an annealing temperature ranges from 300° C. to 400° C. In some embodiments, the annealing temperature ranges from 370° C. to 400° C.

Illustrative Examples

The following illustrative examples are set forth to assist in understanding the embodiments described herein and should not be construed as specifically limiting the present invention described and claimed herein. Such variations of the embodiments, including the substitution of all equivalents now known or later developed, which would be within the purview of those skilled in the art, and changes in formulation or minor changes in experimental design, are to be considered to fall within the scope of the embodiments described herein.

Example 1: Synthesis of $PiNi_3$ Nanopolyhedra

A transparent precursor solution was formed by dissolving 20 mg $H_2PtCl_6.6H_2O$ and 17.5 mg $Ni(NO_3)_2.6H_2O$ in 0.4 mL deionized water. The solution was added to 10 mL oleylamine in a three-necked flask at 160° C. for 2-3 min to remove water. The solution was subsequently heated to 270° C. under an argon atmosphere. The transparent solution turned into a black slurry after 3 min, and the reaction was stopped by rapidly cooling the solution down to room temperature (e.g., about 20° C. to about 23° C.), forming $PtNi_3$ nanopolyhedra. The $PtNi_3$ nanopolyhedra were collected by centrifugation at 5000 rpm, and were measured to be about 20.1±1.9 nm in diameter.

Example 2: Evolution from $PtNi_3$ Nanopolyhedra to $Pt_3Ni$ Nanoframes

The $PtNi_3$ nanopolyhedra of Example 1 were redispersed in hexane, forming a colloidal solution. The colloidal solution was kept under ambient conditions for 2 weeks, resulting in the evolution of $PtNi_3$ nanopolyhedra into $Pt_3Ni$ nanoframes. This evolution process could be accelerated following the procedures below. $PtNi_3$ nanopolyhedra (approximately 3 mg) were redipsersed in 5 mL chloroform, with 0.2 mL oleylamine added. The colloidal solution was diluted with 10 mL hexadecane, and then sonicated for 20 min, followed by heating at 120° C. for 12 hours under ambient conditions. The resulting $Pt_3Ni$ nanoframes were collected by centrifugation at 8000 rpm, and were measured to be about 20.6±1.6 nm in diameter.

Example 3: Scale Up Preparation of $Pt_3Ni$ Nanoframes

A transparent precursor solution was formed by dissolving 200 mg $H_2PtCl_6.6H_2O$ and 175 mg $Ni(NO_3)_2.6H_2O$ in 4 mL deionized water. The solution was added to 100 mL oleylamine in a three-necked flask at 160° C. for 2-3 min to remove water. The solution was subsequently heated to 270° C. under an argon atmosphere. The transparent solution turned into a black slurry after 3 min, and the reaction was stopped by rapidly cooling the solution down to room temperature, forming $PtNi_3$ nanopolyhedra. The $PtNi_3$ nanopolyhedra collected by centrifugation at 8000 rpm, and were redispersed in 100 mL hexadecane with 5 mL oleylamine, sonicated for 20 min, and subsequently incubated at 120° C. for 12 hr under ambient conditions. The resulting $Pt_3Ni$ nanoframes were collected by centrifugation at 8000 rpm, and redispersed in chloroform.

Figure 9A:
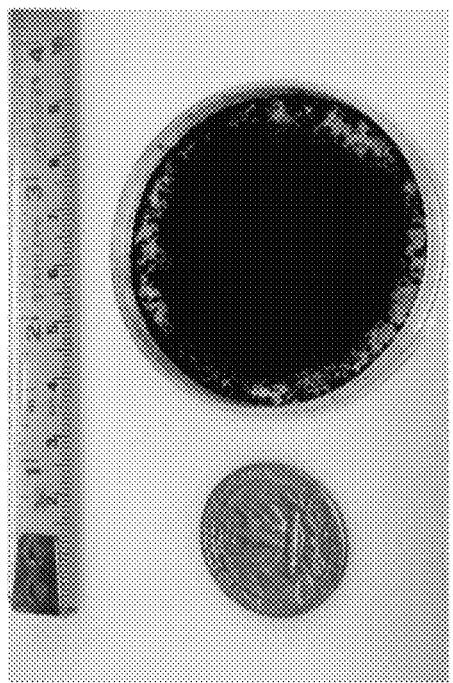
FIG. 9A shows Pt₃Ni nanoframe catalysts on a carbon support according to an embodiment of the disclosure.
Figure 9B:
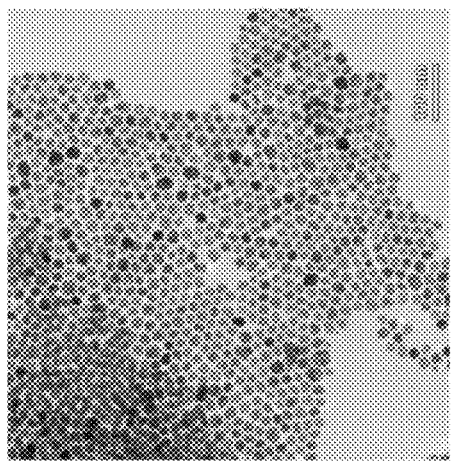
FIG. 9B is a micrograph of PtNi₃ solid rhombic dodecahedra according to an embodiment of the disclosure.
Figure 9C:
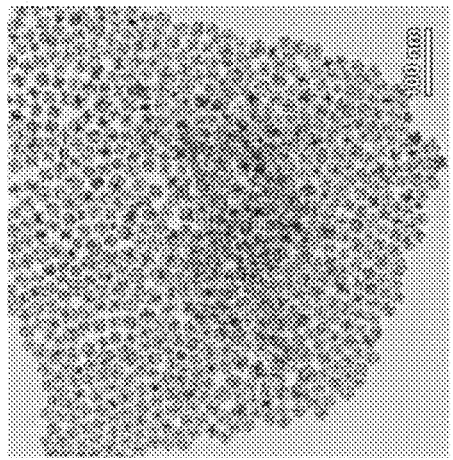
FIG. 9C is a micrograph of PtNi₃ solid rhombic dodecahedra obtained from scaled-up synthesis according to an embodiment of the disclosure.

In some embodiments, a concentration of the precursor solution can be increased (e.g., doubled), resulting in larger $Pt_3Ni$ nanoframes (e.g., about 50 nm in diameter). One-pot synthesis can supply material that is sufficient to prepare catalytic nanoframes (e.g., 20% loading) at the gram-scale. FIG. 9A shows an image of approximately 1 g $Pt_3Ni$ nanoframes catalysts (20% Pt-loading on carbon XC-72). FIGS. 9B and 9C are, respectively, TEM images of $PtNi_3$ solid rhombic dodecahedra and $Pt_3Ni$ nanoframes obtained from a scaled-up synthesis.

Example 4: Preparation of [MTBD][NTf2] Ionic-Liquid

A solution of 7-methyl-1,5,7-triazabicyclo[4.4.0]dec-5-ene [MTBD] was neutralized by drop-wise addition of 10.6 M $HNO_3$. Equimolar amounts of neutralized MTBD and lithium salt of bis(trifluoromethane)sulfonimide [NTf2] were mixed and dissolved in DI water. An ionic-liquid (IL) product precipitated out as a viscous fluid. The IL product was washed multiple times with deionized water and then placed in a vacuum oven at 60° C. for 12 hours to remove residual water. $O_2$ solubility was measured using a Pt microelectrode made by sealing a 25 µm diameter Pt wire in a quartz capillary, as described by Snyder et al. (Nature Materials 9, 904-907 (2010)).

Figure 10A:
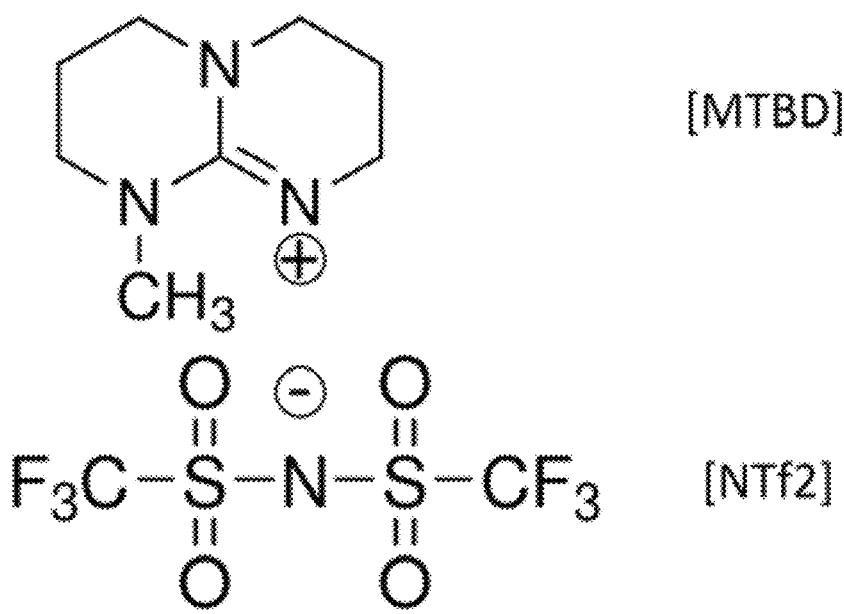
FIG. 10A shows the chemical formulas for 7-methyl-1,5,7-triazabicyclo[4.4.0]dec-5-ene [MTBD] and bis(trifluoromethane)sulfonimide [NTf2].
Figure 10B:
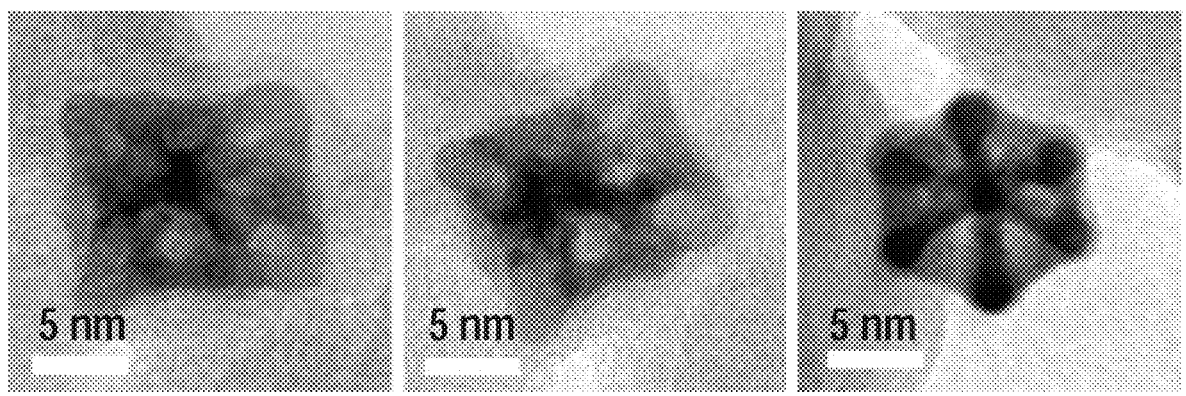
FIG. 10B shows micrographs of ionic-liquid-encapsulated Pt₃Ni nanoframes according to an embodiment of the disclosure.

In some embodiments, protic ILs can be integrated into a nanoframe-based catalyst, where high $O_2$ solubility of IL increases the $O_2$ concentration at the catalyst surface, resulting in higher attempt frequencies for the ORR and consequently higher activity. In one embodiment, [MTBD][NTf$_2$] is used (FIG. 10A), which is an ionic-liquid that has an $O_2$ solubility ($C_{O2,[MTBD][NTf2]}$=2.28±0.12 mM) approximately 2 times higher than that of the common electrolyte $HClO_4$ ($C_{O2,HClO4}$=1.21 mM). FIG. 10B shows TEM images of IL-encapsulated Pt$_3$Ni nanoframes, with the IL being visible as a light gray coating that surrounds nanoframe.

The open architecture of the Pt$_3$Ni nanoframes effectively retains the hydrophobic IL, where capillary forces pull the IL inside the frames and prevent IL from being washed away by electrolyte. The IL-encapsulated Pt$_3$Ni nanoframes show a sustained superior activity upon prolonged (10,000) potential cycling without noticeable decay in performance. The IL-encapsulated Pt$_3$Ni nanoframes exhibited a 36-fold enhancement in mass activity over Pt/C.

Example 5: In Situ Ambient-Pressure XPS Experiments

In situ ambient-pressure XPS (AP-XPS) studies were performed on both solid PtNi$_3$ polyhedral nanoparticles and Pt$_3$Ni nanoframes to investigate the response of Pt and Ni surface concentrations to different gas environments. Pt and Ni concentrations were calculating by integrating peak areas in Pt 4f and Ni 3p spectra after fitting the peaks and corrections with cross-section values. The spectra were acquired with incident X-ray energy of 490 eV to generate photoelectrons with approximately 420 eV kinetic energy, corresponding to an approximately 0.9 nm probing depth.

Figure 11B:
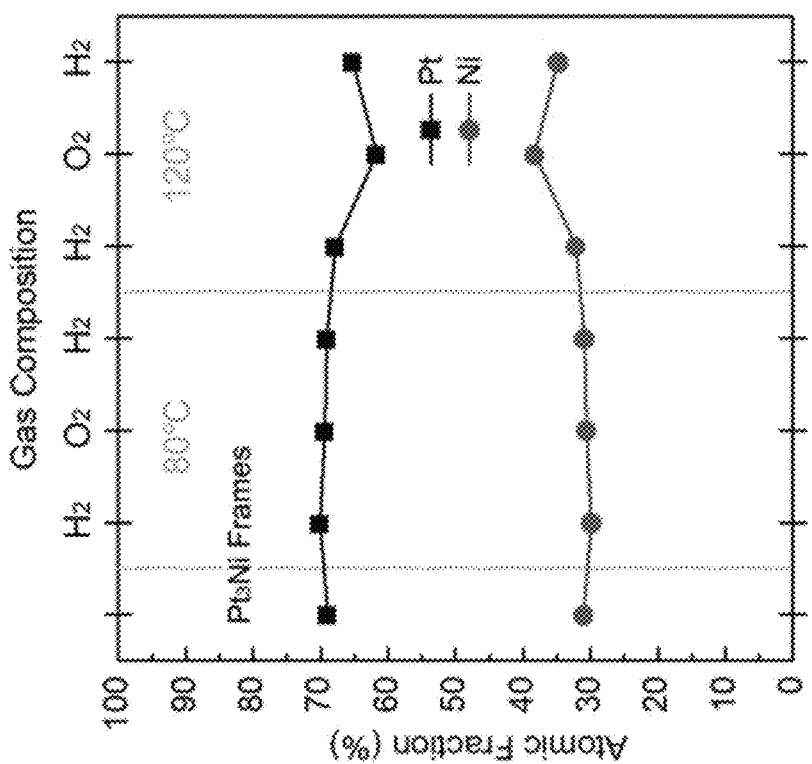
FIG. 11B shows a plot of changes in surface Pt and Ni concentrations in Pt₃Ni nanoframes in response to gas environment changes according to an embodiment of the disclosure.
Figure 11A:
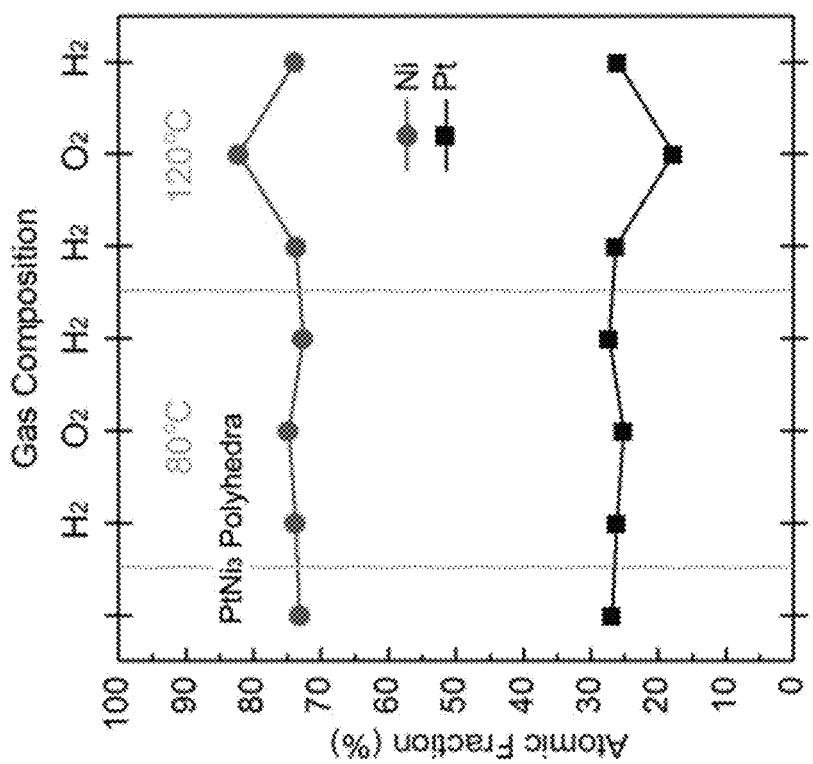
FIG. 11A shows a plot of changes in surface Pt and Ni concentrations in PtNi₃ polyhedral nanoparticles in response to gas environment changes according to an embodiment of the disclosure.

The variation in surface composition can further support the aforementioned compositional evolution mechanism. As shown in FIG. 11A, at 120° C., the surface composition of PtNi$_3$ polyhedra reversibly changes in response to alternating the gas environment. Specifically, the Ni fraction increases under oxygen, and the Pt fraction increases under hydrogen. Such phenomena indicate that the presence of oxygen facilitates the migration of Ni atoms to the surface. Likewise, Pt$_3$Ni nanoframes exhibit similar behaviors under at 120° C. (FIG. 11B), with less prominent variation amplitudes for Pt and Ni, likely owing to a smaller amount of Ni in the system. Variations in surface concentrations of both samples are smaller at lower temperatures (e.g., 80° C.), which may be attributed to lower migration mobility of both Pt and Ni atoms. Altogether, these results confirmed that, in the presence of oxygen, the Ni atoms in PtNi$_3$ polyhedra tend to segregate to the surface, which, in combination of oxidation and dissolution of Ni species, eventually leads to the formation of Pt$_3$Ni phase.

Example 6: Electrochemical Experiments

Synthesized Pt, PtNi nanocrystals, and Pt$_3$Ni nanoframes were incorporated onto carbon black (Cabot, Vulcan XC-72) to produce catalysts. The catalysts were washed by ethanol, and organic surfactants were removed by heating the samples under ambient conditions at temperature below 400° C. for 12 h. Total metal loading was controlled to be within in the range of 20% weight. The actual loadings were determined by inductively coupled plasma mass spectrometry (ICP-MS). The catalysts were washed with 0.1 M $HClO_4$ and then were prepared as catalyst inks by adding water (approximately 0.5 mg catalysts/mL water), followed by sonication for 30 min. After sonication, 10 µL inks were deposited noto glassy carbon electrode (6 mm in diameter) and dried to form uniform thin films. The Ni(OH)$_2$-modified electrodes for HER studies were prepared as described by Subbaraman et al. (*Science* 334, 1256 (2011)).

Electrochemical measurements were conducted in a three-compartment electrochemical cell with a Pine rotational disk electrode (RDE) setup and an Autolab 302 potentiostat. A saturated Ag/AgCl electrode and a Pt wire were used as reference and counter electrodes, respectively. KOH (0.1 M) was used as electrolyte for HER studies and $HClO_4$ was used as electrolyte for others. Sweep rates of 50 mV/s were used for cyclic voltammetry (VC) and HER, and 20 mV/s was used for ORR measurements (RDE rotating rate of 1600 rpm). The current densities for ORR and HER were corrected by ohmic iR drop compensation during the measurements. All of the potentials are versus a reversible hydrogen electrode (RHE). Stability tests (25° C.) were carried out by 10,000 cycles between 0.6 and 1.0 V at 2-200 mV/s. Nafion solution was used to prepare working electrodes for the stability test.

For the Pt$_3$Ni nanoframes/IL catalysts, a drop of IL was deposited onto an electrode covered with a Pt$_3$Ni nanoframes catalyst layer. After 10-15 min, the electrode was dipped into 0.1M $HClO_4$, and was cycled between 0.05 and 0.92 V for 50 cycles under Ar and at a scan rate of 50 mV/s. After the cycling, the ORR activity was tested in fresh electrolyte. For the data shown in FIGS. 12A-12C, the tests were carried out on the same electrode, respectively. The stability test was carried out in a similar manner as described above.

FIG. 12A shows ORR polarization curves on Pt$_3$Ni nanoframes/C catalysts with IL (plot 1202) and without IL (plot 1204). FIG. 12B shows ORR polarization curves on Pt/C catalysts with IL (plot 1212) and without IL (plot 1214), which reveal that the Pt/C catalysts cannot retain IL after washing with electrolyte, and lack sustained enhancement. FIG. 12C shows ORR polarization curves on Pt$_3$Ni nanoframes/C catalysts with IL, revealing that the catalysts are stable after 10,000 cycles (plot 1224) compared to initial performance (plot 1222).

The above examples are provided to illustrate embodiments of the present invention but not to limit its scope. It should be noted that different references to "an" or "one" embodiment in this disclosure are not necessarily to the same embodiment, and such references mean at least one. Other variants of the present invention will be readily apparent to one of ordinary skill in the art. The scope of the invention should, therefore, be determined with reference to the appended claims, along with the full scope of equivalents to which such claims are entitled.

What is claimed is:

1. A composition of matter, comprising:
a bimetallic nanoframe having a polyhedral shape with a hollow interior and having a ratio of electrochemically-active surface area to volume that is greater than 2 nm$^{-1}$.

2. The composition of matter of claim 1, wherein the bimetallic nanoframe comprises a composition of a form of $X_nY_m$, wherein X is a metal selected from a first group consisting of Pt, Pd, Rh, and Au, and wherein Y is a metal selected from a second group consisting of Ni, Cu, and Co.

3. The composition of matter of claim 1, wherein the composition comprises Pt$_3$Ni.

4. The composition of matter of claim 1, wherein the composition comprises Pt at a concentration of greater than 60% by weight of the bimetallic nanoframe.

5. The composition of matter of claim 4, wherein the electrochemically-active surface area is formed by a portion of the Pt present as a skin structure.

6. The composition of matter of claim 1, wherein the bimetallic nanoframe was formed according to a process comprising reacting a precursor particle with oxygen, wherein the reacting effects formation of the bimetallic nanoframe.

7. A composition of matter, comprising:
a bimetallic open frame nanoframe having a polyhedral shape defined by a plurality of interconnected struts forming edges of the polyhedral shape and further defining at least four facets of the polyhedral shape exposing a hollow interior, the bimetallic nanoframe further having a ratio of electrochemically-active surface area to volume that is greater than 2 $nm^{-1}$, wherein the nanoframe comprises a plurality of interconnected struts arranged to form the edges of a polyhedron, defining a hollow interior volume, wherein each of the plurality of interconnected struts has a diameter less than 10 nanometers (nm) and a length of 50 nm.

8. The composition of matter of claim 7, wherein the diameter of each of the plurality of interconnected struts is 2 nm.

9. The composition of matter of claim 7, wherein each of the plurality of struts has an electrochemically-active surface area formed by a portion of Pt present as a skin structure.

* * * * *